US012704607B2

(12) United States Patent
Yu et al.

(10) Patent No.: US 12,704,607 B2
(45) Date of Patent: Aug. 11, 2026

(54) MULTI-RANGE LiDAR SYSTEMS AND METHODS

(71) Applicant: VELODYNE LIDAR USA, INC., San Jose, CA (US)

(72) Inventors: Meng-Day Yu, Fremont, CA (US); Daniel Anderson, San Jose, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 1261 days.

(21) Appl. No.: 17/565,360

(22) Filed: Dec. 29, 2021

(65) Prior Publication Data

US 2023/0204730 A1 Jun. 29, 2023

(51) Int. Cl.
*G01S 7/4863* (2020.01)
*G01S 7/48* (2006.01)
*G01S 7/481* (2006.01)
*G01S 7/487* (2006.01)

(52) U.S. Cl.
CPC .......... *G01S 7/4863* (2013.01); *G01S 7/4802* (2013.01); *G01S 7/4817* (2013.01); *G01S 7/487* (2013.01)

(58) Field of Classification Search
CPC .... G01S 7/4863; G01S 7/4802; G01S 7/4817; G01S 7/487; G01S 7/4815; G01S 7/484; G01S 17/931
See application file for complete search history.

(56) References Cited

U.S. PATENT DOCUMENTS

2002/0193670 A1* 12/2002 Garfield ................. A61B 5/344 600/304
2015/0247721 A1* 9/2015 Barkley ................. G01B 11/02 348/51
2016/0003946 A1* 1/2016 Gilliland ................. G01S 17/10 356/5.01
2020/0064452 A1* 2/2020 Avlas .................... G01S 7/4804
2020/0271789 A1* 8/2020 Schmidt ................ G01S 7/4804
(Continued)

OTHER PUBLICATIONS

PCT/US2022/082433, "International Search Report and Written Opinion", Apr. 6, 2023, 12 pages.
(Continued)

*Primary Examiner* — Isam A Alsomiri
*Assistant Examiner* — Joseph C Fritchman
(74) *Attorney, Agent, or Firm* — Kilpatrick Townsend & Stockton LLP

(57) ABSTRACT

A light detection and ranging (LiDAR) method includes transmitting, by a first transmitter, a first optical signal. The method includes receiving first return signals corresponding to the first optical signal during a first long-range listening period and/or a first short-range listening period. The method includes transmitting, by the first transmitter, a second optical signal. The method includes transmitting, by a second transmitter, a third optical signal. The method includes detecting a set of return signals during a second short-range listening period, the set comprising second return signals corresponding to the second optical signal and/or third return signals corresponding to the third optical signal. The method includes sampling the set of return signals. The method includes filtering the sampled set of return signals detected during the second short-range listening period based on the first return signals received during the first-short range listening period.

46 Claims, 14 Drawing Sheets

(56) References Cited

U.S. PATENT DOCUMENTS

| | | | | |
|---|---|---|---|---|
| 2020/0371235 | A1 | 11/2020 | Shand | |
| 2021/0003706 | A1* | 1/2021 | Hwangbo | G01S 17/10 |
| 2021/0181341 | A1* | 6/2021 | Kato | G05B 13/0265 |
| 2021/0286073 | A1* | 9/2021 | Osako | G01S 7/52026 |
| 2022/0043157 | A1* | 2/2022 | Chen | G01S 17/931 |
| 2022/0120867 | A1* | 4/2022 | Liang | G01S 7/4815 |

OTHER PUBLICATIONS

Shand, "Origins and Mitigations of some Automotive Pulsed Lidar Artifacts", Spie Proceedings, vol. 11299, Feb. 24, 2020, 7 pages.

* cited by examiner

MULTI-RANGE LiDAR SYSTEMS AND METHODS

FIELD OF TECHNOLOGY

The present disclosure relates generally to light detection and ranging ("LiDAR") technology and, more specifically, to LiDAR systems for detecting objects in both the near and far fields.

BACKGROUND

Light detection and ranging ("LiDAR") systems measure the attributes of their surrounding environments (e.g., shape of a target, contour of a target, distance to a target, reflectivity of a target, etc.) by illuminating the target with light (e.g., laser light) and measuring the reflected light with sensors. Laser return signals can then be used to make digital, three-dimensional ("3D") representations of a surrounding environment. LiDAR technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), and so forth. Depending on the application and associated field of view (FOV), multiple channels or laser beams may be used to produce images in a desired resolution. A LiDAR system with greater numbers of channels can generally generate larger numbers of pixels.

In a multi-channel LiDAR device, optical transmitters are paired with optical receivers to form multiple "channels." In operation, each channel's transmitter emits an optical (e.g., laser) signal into the device's environment, and each channel's receiver detects the portion of the return signal that is reflected back to that receiver by the surrounding environment. In this way, each channel provides "point" measurements of the environment, which can be aggregated with the point measurements provided by the other channel(s) to form a "point cloud" of measurements of the environment.

Advantageously, the measurements collected by any LiDAR channel may be used to determine the distance ("range") from the device to the surface in the environment that reflected the channel's transmitted optical signal back to the channel's receiver. In some cases, the range to a surface may be determined based on the propagation delay (e.g., time of flight (TOF)) of the channel's signal (e.g., the time elapsed from the transmitter's emission of the optical signal to the receiver's reception of the return signal reflected by the surface). In other cases, the range may be determined based on the wavelength (or frequency) of the return signal (s) reflected by the surface.

In some instances, LiDAR measurements may be used to determine the reflectance of the surface that reflects an optical (e.g., illumination) signal. The reflectance of a surface may be determined based on the intensity on the return signal, which generally depends not only on the reflectance of the surface but also on the range to the surface, the emitted signal's glancing angle with respect to the surface, the power level of the channel's transmitter, the alignment of the channel's transmitter and receiver, and other factors.

In some instances, a multi-range LiDAR device may be used to detect surfaces in the surrounding environment at different ranges from the device. Due to propagation delay differences for channel signals reflecting from surfaces of longer and shorter ranges, the multi-range LiDAR device may have a longer "listening period" to detect longer range surfaces in the environment and may have a shorter "listening period" to detect shorter range surfaces in the environment. In some cases, if the longer and shorter listening periods are successive (i.e. back-to-back) or approximately successive, the multi-range LiDAR device may observe aliasing of detected return signals. Aliasing may occur when multiple return signals corresponding to surfaces of different ranges have the same measured distance from the LiDAR device. Surfaces beyond the expected maximum range of the LiDAR that have high reflectivity may be sources for aliasing, as they may reflect return signals to a channel's receiver at a time after the listening period for an emitted signal. To mitigate aliasing, conventional LiDAR devices often include spatial (e.g., angular) and/or temporal separation between emitted signals, such that return signals are detected via different receive paths (as in spatial separation) and/or at different points in time (as in temporal separation) to avoid aliasing. However, these solutions can increase device complexity (e.g., due to adding spatial separation between emitted signals) and increase device operating time (due to increased idle times to allow for temporal separation).

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are LiDAR systems for near-field and far-field detection and ranging, and related methods and apparatus. According to one embodiment, a light detection and ranging (LiDAR) method includes transmitting, by a first transmitter, a first optical signal. The method further includes receiving one or more first return signals corresponding to the first optical signal during a first long-range listening period and/or a first short-range listening period. The method further includes transmitting, by the first transmitter, a second optical signal. The method further includes transmitting, by a second transmitter, a third optical signal. The method further includes detecting a set of return signals during a second short-range listening period, where the set of return signals comprises one or more second return signals corresponding to the second optical signal and/or one or more third return signals corresponding to the third optical signal. The method further includes sampling the set of return signals. The method further includes filtering the sampled set of return signals detected during the second short-range listening period based on the one or more first return signals received during the first-short range listening period.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
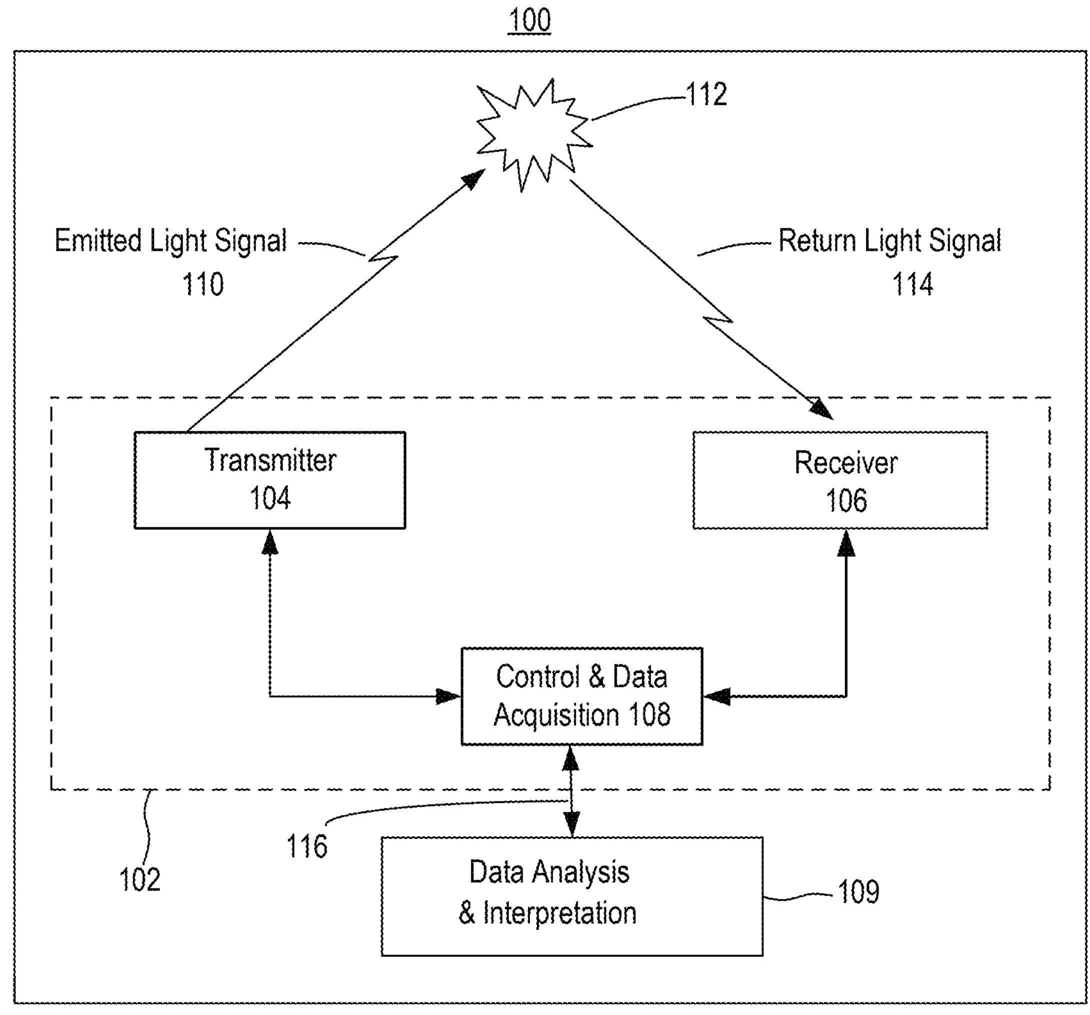
FIG. 1 shows an illustration of an exemplary LiDAR system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for mitigation of aliasing in LiDAR-based near-field and far-field detection are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Motivation for and Benefits of Some Embodiments

Multi-range LiDAR devices may be capable of short-range and medium- to long-range detection of objects in a surrounding environment. To detect objects in the short-range and the medium- to long-range, a multi-range LiDAR device may be configured with one or more emitters (e.g., a near-field emitter and one or more far-field emitters) corresponding to a receiver for a particular channel. A near-field emitter may be configured to emit a lower-power signal to detect objects at short-range, while a far-field emitter (or set of far-field emitters) may be configured to emit a higher-power signal to detect objects at a medium- to long-range. The range of each emitter may be configured as a function of the nominal (e.g., intended) maximum range of the emitter, as well as the minimum reflectivity of an object (and corresponding minimum return signal intensity) at the maximum range. Accordingly, it is possible for objects of higher reflectivity to reflect a return signal at a range higher than the maximum range, resulting in potential to detect return signals at times beyond the configured listening period. In some cases, if a LiDAR device is configured with consecutive listening periods (e.g., for far-field and near-field observations), return signals reflected from objects beyond the maximum range may be observed in an unsuitable listening period, such that the return signals are aliased and the objects are measured as being at incorrect distances from the LiDAR device.

Problematically, due to aliasing between return signals corresponding to a near-field emitter and a far-field emitter, some multi-range LiDAR devices currently do not use consecutive listening periods for far-field and near-field object detection, as consecutive listening periods can result in return signals originating from a far-field emitter (and corresponding to far-field detection) being detected in a listening period corresponding to near-field detection. Instead, conventional multi-range LiDAR devices apply spatial and/or temporal separation between optical emissions from a far-field and near-field emitter, such that aliasing is mitigated for listening periods corresponding to the far-field and near-field emissions and detections. But, such solutions increase operating times for multi-range LiDAR devices, as additional idle-times are required to introduce temporal separation between far-field and near-field listening periods. Further, adding spatial (e.g., angular) separation between far-field and near-field emitters can introduce additional cost and complexity to the multi-range LiDAR devices, as multiple spatially-separated channels may be necessary to detect short-range and medium- to long-range objects.

Accordingly, it would be desirable to provide a LiDAR system that is structured and arranged to provide solutions to detect and mitigate aliasing between consecutive far-field and near-field listening periods, allowing for short-range and medium- to long-range detection of objects without the spatial and/or temporal separation required by conventional solutions.

Exemplary LiDAR Systems

A light detection and ranging ("LiDAR") system may be used to measure the shape and contour of the environment surrounding the system. LiDAR systems may be applied to numerous applications including autonomous navigation and aerial mapping of surfaces. In general, a LiDAR system emits light that is subsequently reflected by objects within the environment in which the system operates. In some examples, the LiDAR system is configured to emit light pulses. The propagation delay (e.g., time of flight) of each pulse from being emitted to being received may be measured to determine the distance between the LiDAR system and the object that reflects the pulse. In other examples, the LiDAR system can be configured to emit continuous wave (CW) light. The wavelength (or frequency) of the received, reflected light may be measured to determine the distance between the LiDAR system and the object that reflects the light. In some examples, LiDAR systems can measure the speed (or velocity) of objects. The science of LiDAR systems is based on the physics of light and optics.

In a LiDAR system, light may be emitted from a rapidly firing laser. Laser light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1 depicts the operation of the medium- and long-range portion of an exemplary LiDAR system 100, according to some embodiments. In the example of FIG. 1, the LiDAR system 100 includes a LiDAR device 102, which may include a transmitter 104 that generates and transmits a light signal 110, a receiver 106 that detects a return light signal 114, and a control & data acquisition module 108. The transmitter 104 may include a light source (e.g., laser), electrical components operable to activate ("drive") and deactivate the light source in response to electrical control signals, and optical components adapted to shape and redirect the light emitted by the light source. The receiver 106 may include an optical detector (e.g., photodiode) and optical components adapted to shape return light signals 114 and direct those signals to the detector. In some implementations, one or more of optical components (e.g., lenses, mirrors, etc.) may be shared by the transmitter and the receiver. The LiDAR device 102 may be referred to as a LiDAR transceiver or "channel." In operation, the emitted (e.g., illumination) light signal 110 propagates through a medium and reflects off an object(s) 112, whereby a return light signal 114 propagates through the medium and is received by receiver 106.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some variations, the control & data acquisition module 108 determines (e.g., measures) particular characteristics of the return light signal 114 detected by the receiver 106. For example, the control & data acquisition module 108 may measure the intensity of the return light signal 114 using any suitable technique.

A LiDAR transceiver 102 may include one or more optical lenses and/or mirrors (not shown) to redirect and shape the emitted light signal 110 and/or to redirect and shape the return light signal 114. The transmitter 104 may emit a laser beam (e.g., a beam having a plurality of pulses in a particular sequence). Design elements of the receiver 106 may include its horizontal field of view (hereinafter, "FOV") and its vertical FOV. One skilled in the art will recognize that the FOV parameters effectively define the visibility region relating to the specific LiDAR transceiver 102. More generally, the horizontal and vertical FOVs of a LiDAR system 100 may be defined by a single LiDAR device (e.g., sensor) or may relate to a plurality of configurable sensors (which may be exclusively LiDAR sensors or may have different types of sensors). The FOV may be considered a scanning area for a LiDAR system 100. A scanning mirror and/or rotating assembly may be utilized to obtain a scanned FOV.

In some implementations, the LiDAR system 100 may include or be electronically coupled to a data analysis & interpretation module 109, which may receive outputs (e.g., via connection 116) from the control & data acquisition module 108 and perform data analysis functions on those outputs. The connection 116 may be implemented using a wireless or non-contact communication technique.

Figure 2A:
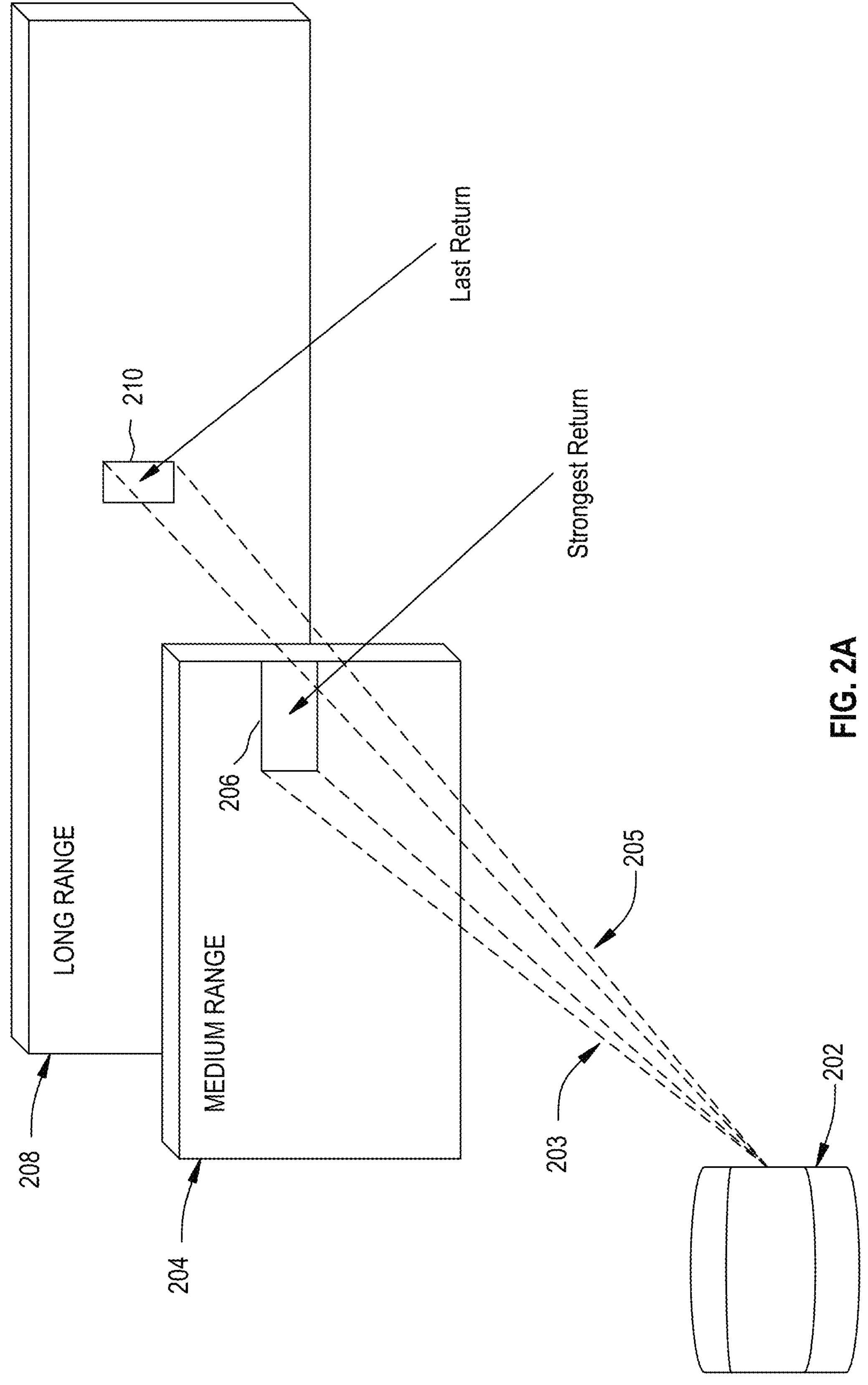
FIG. 2A shows an illustration of the operation of the LiDAR system of FIG. 1, in accordance with some embodiments.

FIG. 2A illustrates the operation of the medium- and long-range portion(s) of a LiDAR system 202, in accordance with some embodiments. In the example of FIG. 2A, two return light signals 203 and 205 are shown, corresponding to medium-range and long-range return signals. Laser beams generally tend to diverge as they travel through a medium. Due to the laser's beam divergence, a single laser emission may hit multiple objects at different ranges from the LiDAR system 202, producing multiple return signals 203, 205. The LiDAR system 202 may analyze multiple return signals and report one of the return signals (e.g., the strongest return signal, the last return signal, etc.) or more than one (e.g., all) of the return signals. In the example of FIG. 2A, LiDAR system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter propagation delay and a stronger received signal strength compared with return (e.g., long-range) signal 205. In both single- and multiple-return LiDAR systems, it is important that each return signal is accurately associated with the transmitted light signal so that one or more attributes of the object that reflects the light signal (e.g., range, velocity, reflectance, etc.) can be correctly calculated.

Some embodiments of a LiDAR system may capture distance data in a two-dimensional (2D) (e.g., single plane) point cloud manner. These LiDAR systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the LiDAR system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each pointing at a different elevation (e.g., vertical) angle. Design elements of the receiver of the LiDAR system 202 may include the horizontal FOV and the vertical FOV.

Figure 2B:
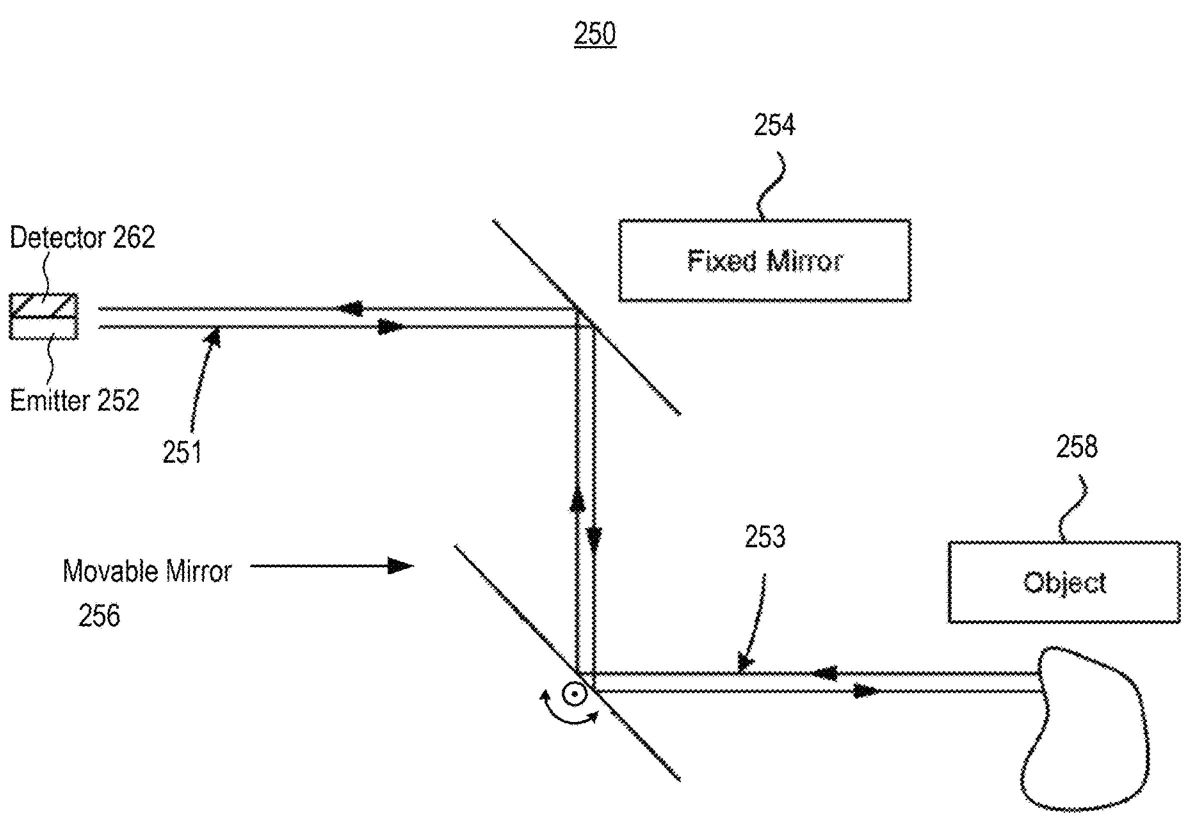
FIG. 2B shows an illustration of optical components of a channel of a LiDAR system (e.g., a "directional" LiDAR system), in accordance with some embodiments.

FIG. 2B depicts a LiDAR system 250 with a movable (e.g., oscillating) mirror, according to some embodiments. In the example of FIG. 2B, the LiDAR system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. Design elements of the LiDAR system 250 include the horizontal FOV and the vertical FOV, which define a scanning area.

Figure 2C:
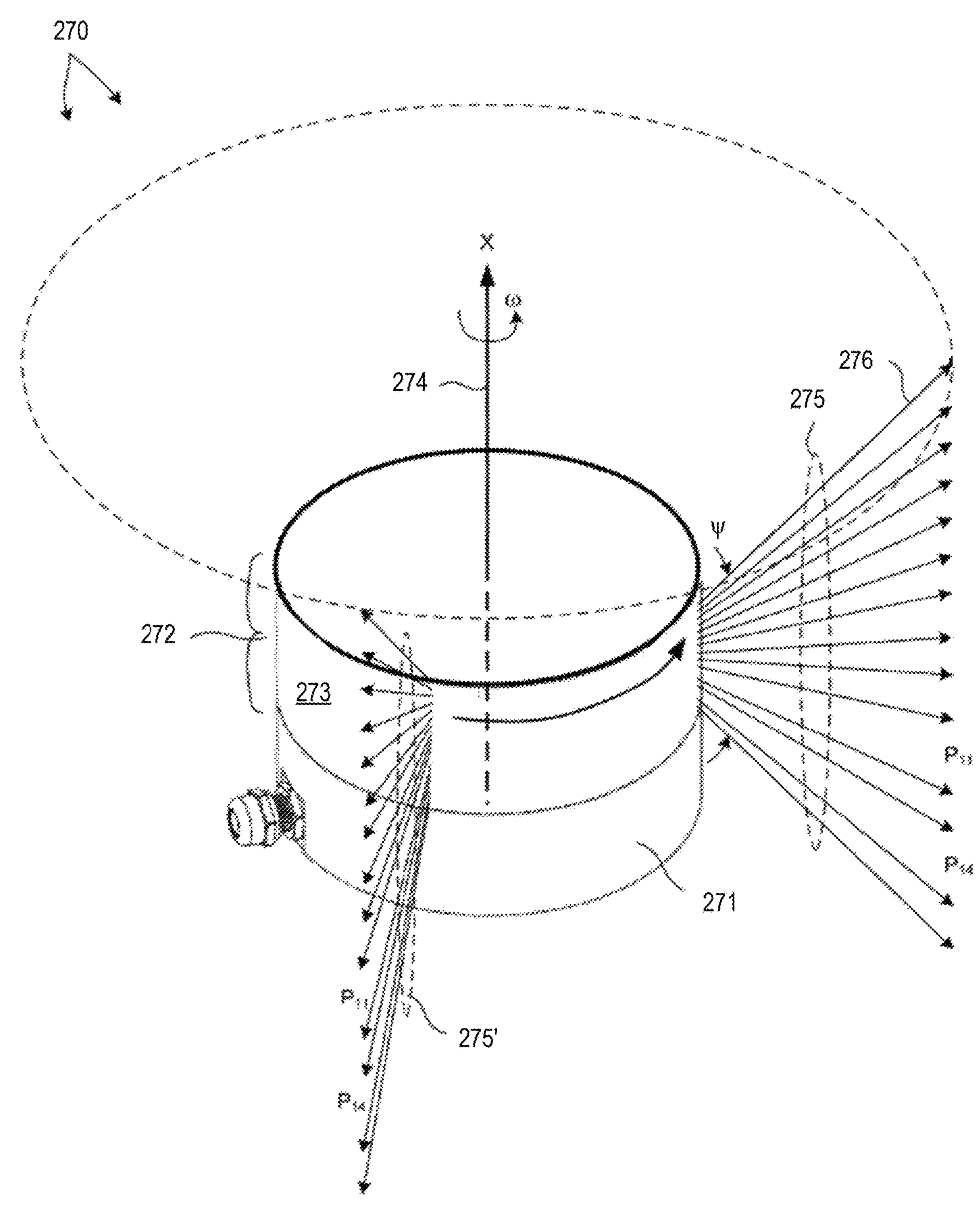
FIG. 2C shows an illustration of an example of a three-dimensional ("3D") LiDAR system, in accordance with some embodiments.

FIG. 2C depicts a 3D LiDAR system 270, according to some embodiments. In the example of FIG. 2C, the 3D LiDAR system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D LiDAR system 270 includes a LiDAR transceiver 102 operable to emit laser beams 276 through the cylindrical shell element 273 of the upper housing 272. In the example of FIG. 2C, each individual arrow in the sets of arrows 275, 275' directed outward from the 3D LiDAR system 270 represents a laser beam 276 emitted by the 3D LiDAR system. Each beam of light emitted from the system 270 may diverge slightly, such that each beam of emitted light forms a cone of illumination light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D LiDAR system 270. The direction of each emitted beam may be determined by the angular orientation ω of the transceiver's transmitter 104 with respect to the system's central axis 274 and by the angular orientation y of the transmitter's movable mirror 256 with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation y of the transmitter's movable mirror. Alternatively, the direction of an emitted beam in a vertical dimension may be determined the transmitter's angular orientation ω, and the direction of the emitted beam in a horizontal dimension may be determined by the angular orientation y of the transmitter's movable mirror. (For purposes of illustration, the beams of light 275 are illustrated in one angular orientation relative to a non-rotating coordinate frame of the 3D LiDAR system 270 and the beams of light 275' are illustrated in another angular orientation relative to the non-rotating coordinate frame.)

The 3D LiDAR system 270 may scan a particular point (e.g., pixel) in its field of view by adjusting the orientation ω of the transmitter and the orientation w of the transmitter's movable mirror to the desired scan point (ω, ψ) and emitting a laser beam from the transmitter 104. Likewise, the 3D LiDAR system 270 may systematically scan its field of view by adjusting the orientation ω of the transmitter and the orientation w of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a LiDAR transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" of the scan point associated with the transmitted beam 110 and the return beam 114.

In many LiDAR systems, the optical component(s) of a LiDAR transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location L0 of the spot that would have been formed absent the intervening rotation of the optical component(s) during the ranging period is referred to herein as "walk-off."

Hybrid LiDAR System

Figure 3A:
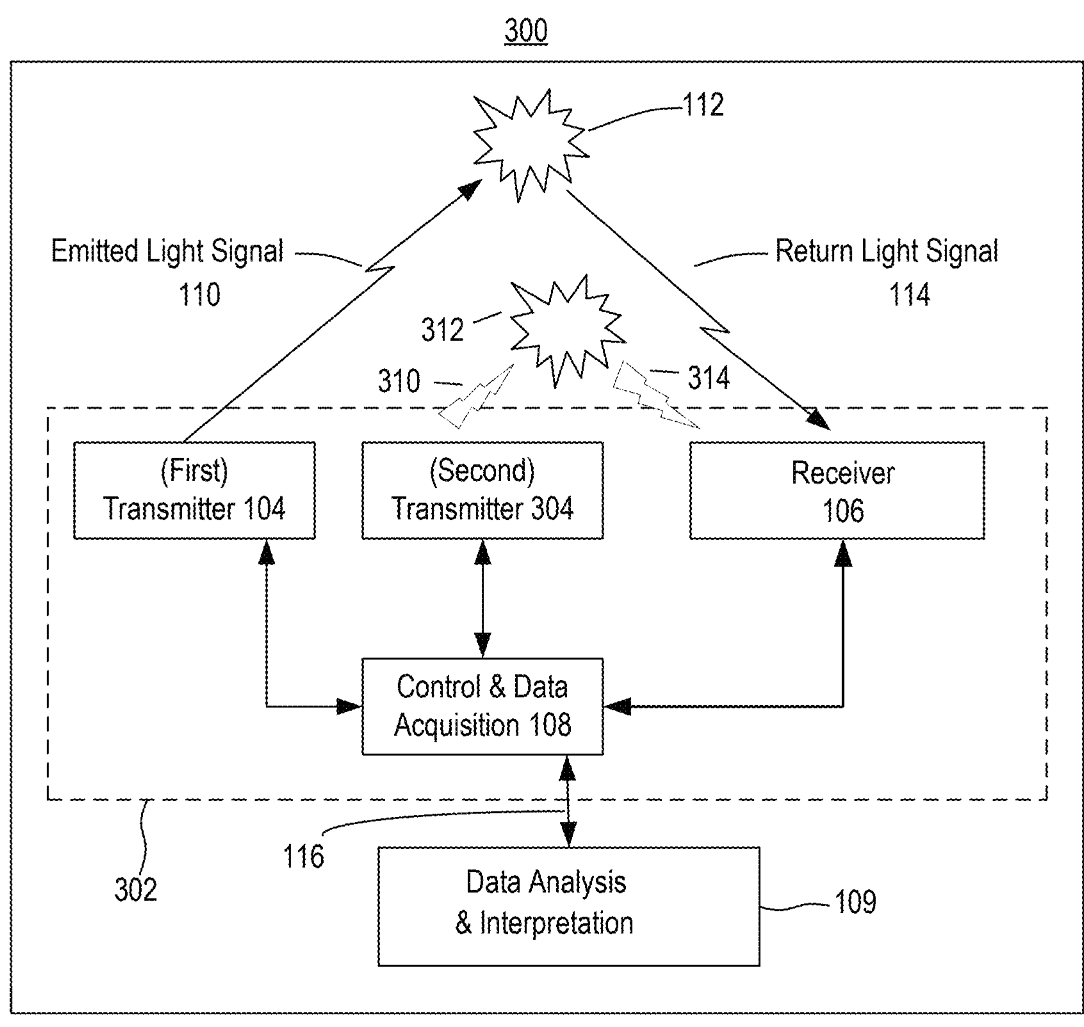
FIG. 3A shows a block diagram of a hybrid LiDAR system, in accordance with some embodiments.

Referring to FIG. 3A, a block diagram of an illustrative (e.g., hybrid) LiDAR system 300 that is structured and arranged to provide long-, medium-, and short-range detection in accordance with some embodiments is shown. Although the hybrid LiDAR system 300 will be described as part of a system that is capable of detecting and processing short-range return signals as well as medium- and long-range return signals, those skilled in the art can appreciate that a stand-alone system may be designed to detect and process only short-range return signals. In some implementations, the short-range components are capable of detecting objects in the range of about 10 to about 20 meters from the LiDAR system 300; although application of a diffuser 306 to the short-range illumination signals may limit the detection range to about 1 or 2 meters (or less).

In some variations, the hybrid LiDAR system 300 is a solid-state system that is structured and arranged to include a far-field transmitter 104 (e.g., "first," "primary," or "far-field" transmitter), a transmitter 304 (e.g., "second," "supplemental," "flash," or "near-field" transmitter), a receiver 106, a control & data acquisition module 108, and a data analysis & interpretation module 109. Collectively, the far-field transmitter 104, receiver 106, and control & data acquisition module 108 may be configured to operate as a far-field LiDAR device (e.g., channel), capable of providing data from medium- and long-range scan areas as previously described. In some implementations, the far-field transmitter 104 is configured to emit laser (e.g., illumination) light signals 110 towards a medium- and long-range scan area and to receive return signals 114 therefrom. In some embodiments, the light source of the far-field transmitter 104 may be a light-emitting diode (LED), an edge-emitting diode laser, a line laser having an edge emitter and a (e.g., fiber) filter, or any other light source suitable for transmitting illumination signals to the far field. In some embodiments, after being shaped by the optical components of the far-field transmitter 104, the emitted light signal 110 may be tightly focused (e.g., with divergence of less than 15 degrees, less than 10 degrees, less than 5 degrees, less than 2 degrees, or less than 1 degree), and may have a range of tens to hundreds of meters.

Collectively, the near-field transmitter 304, receiver 106, and control & data acquisition module 108 may be configured to operate as a near-field LiDAR device (e.g., channel), capable of providing data from short-range scan areas. In some applications, the near-field transmitter 304 is structured and arranged to generate and emit a (e.g., supplemental) laser (e.g., illumination) signal 310 that is capable of illuminating objects 312 in a short-range scan area located within the near field, such that the (e.g., short-range) return signals 314 may be received and detected by the receiver 106.

In some applications, the near-field transmitter 304 may be adapted to emit a short-range light (e.g., illumination) beam 310 to illuminate objects in the near field. The short-range beam (sometimes referred to herein as a "flash beam") may be significantly more diffuse and more divergent than the long-range light beam 110, such that the short-range beam's energy density decreases rapidly with distance and effective range is low (e.g., a few meters). In some embodiments, the near-field transmitter 304 includes one or more laser emitters each capable of emitting a (e.g., short-range) laser beam. In some variations, each of the emitters of the transmitter 304 may be a vertical-cavity surface-emitting lasers (VCSELs), a line laser having an edge emitter and a (e.g., fiber) filter, etc. In some embodiments, the short-range transmitter 304 may also include one or more diffusers adapted to shape the beams generated by the short-range transmitter 304 such that they fill the horizontal and vertical FOV of the LiDAR device 302.

Figure 3B:
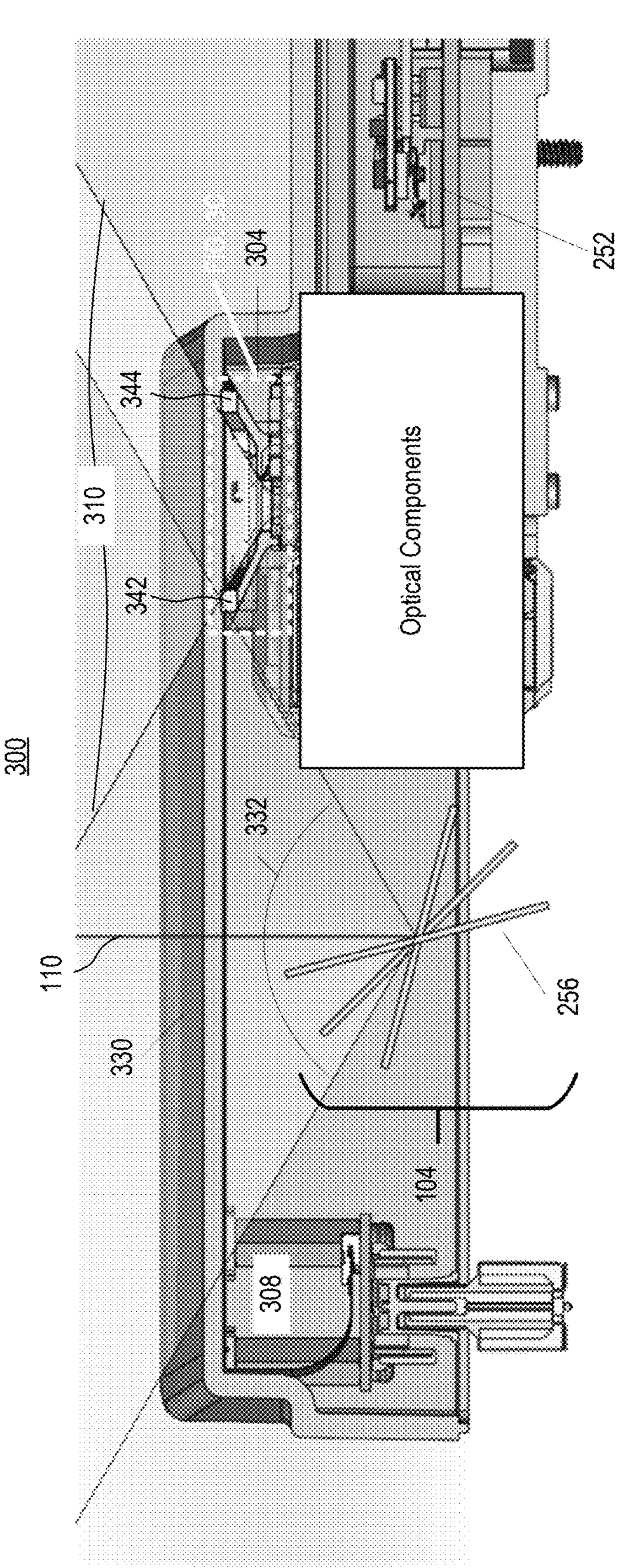
FIG. 3B shows a cross-sectional view of a portion of a hybrid LiDAR system, in accordance with some embodiments.

Referring to FIG. 3B, a cross-sectional view of a portion of one possible implementation of a hybrid LiDAR system 300 is shown. In the example of FIG. 3B, the far-field transmitter 104 includes an emitter 252, one or more optical components (e.g., lenses), and a movable mirror 256. The movable mirror 256 may be configured to scan the long-range beam 110 generated by the emitter 252 over the horizontal FOV 332 (e.g., 120 degrees). In some embodiments, the LiDAR system 300 may include a set of far-field transmitters 104 (e.g., an array 8, 16, 32, 64, or 128 far-field transmitters), each of which may horizontally scan a different portion of the system's vertical FOV (e.g., 32 degrees).

In the example of FIG. 3B, the far-field transmitter 104 is positioned below the near-field transmitter 304. In this example, the receiver 106 is not shown, but shares at least a portion of the optical path of the transmitter 104. Because the far-field emitter 252 is positioned relatively close to the receiver 106 and to one or more optical components (which may reflect portions of an illumination beam emitted by the far-field emitter 252), the dazzle produced by the far-field emitter 252 at the receiver 106 can be very strong. In contrast, any dazzle produced by the near-field transmitter 304 at the receiver 106 is much weaker, for at least two reasons. First, the receiver 106 and near-field transmitter 304 are located in separate, physically partitioned compartments, with baffles (342, 344) configured to limit optical communication between the compartments. This physical partitioning and optical shielding limit the amount of dazzle that might otherwise be produced by the emission of the line beam 310 from the short-range transmitter 304. Second, even if a small amount of light emitted by the short-range transmitter 304 reflects off the viewing window 330 of the LiDAR system 300 and is directed to the receiver 106, any dazzle produced by such internally reflected signals is relatively weak because such internally reflected signals are not directly incident on the receiver 106.

Figure 3C:
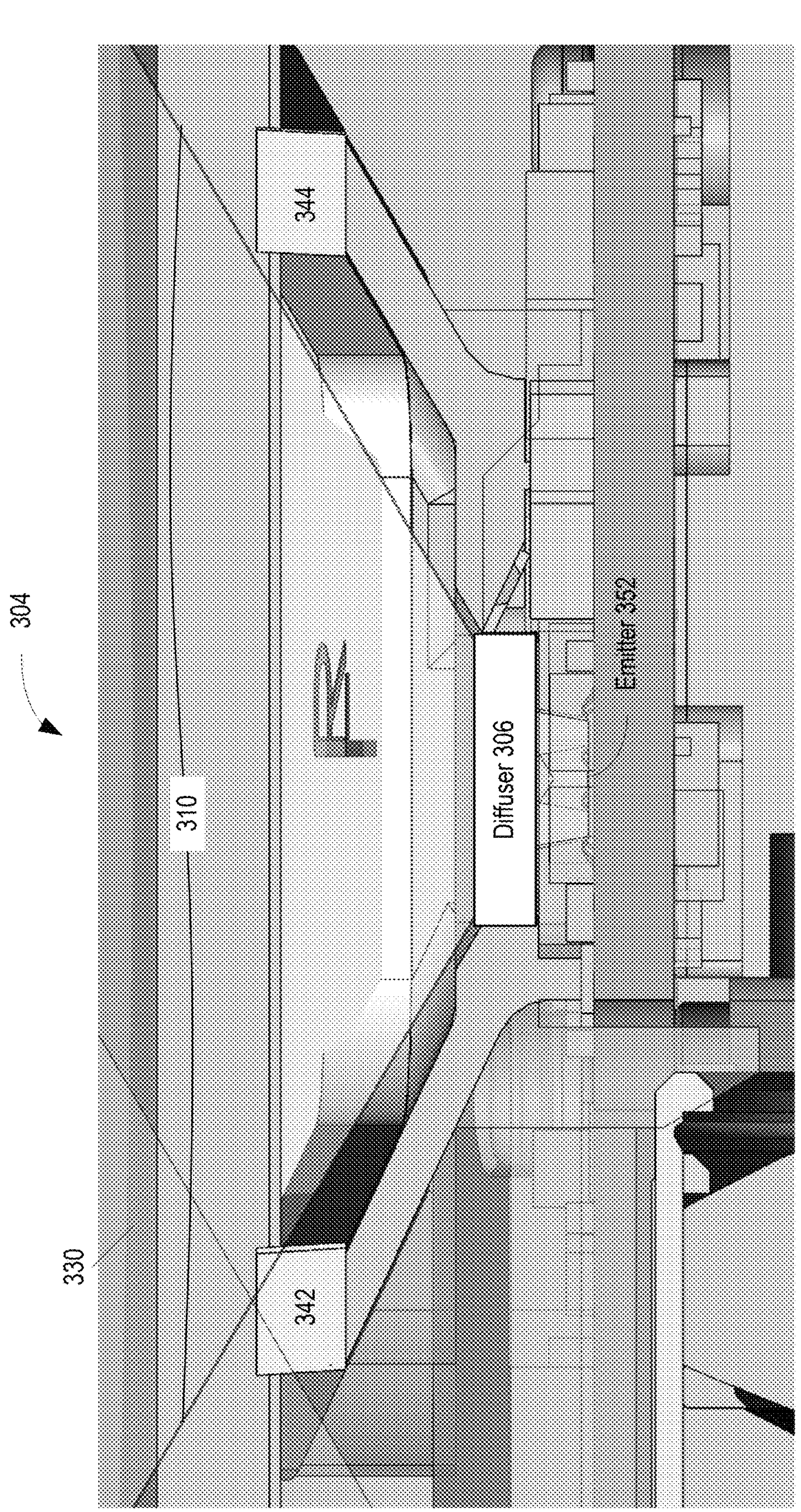
FIG. 3C shows a cross-sectional view of a short-range LiDAR transmitter, in accordance with some embodiments.

FIG. 3C shows a cross-sectional view of a near-field LiDAR transmitter 304, in accordance with some embodiments. As discussed above, the near-field transmitter 304 may include an emitter 352 and a diffuser 306. The emitter 352 may be, for example, a VCSEL. The VCSEL may emit a line beam perpendicular to the substrate of the chip in which the VCSEL is formed. In some embodiments, the beam emitted by the VCSEL is substantially symmetric and exhibits substantial divergence (e.g., 20 degrees by 20 degrees). In some embodiments, the VCSEL may emit a pulsed beam, with a pulse repetition frequency of approximately 200 kHz. Other pulse repetition frequencies (e.g., frequencies between 50 kHz and 500 kHz) are possible. In some embodiments, the emitted line beam is shaped by a diffuser 306. The diffuser 306 may be any suitable diffractive beam-shaping optical component. In some embodiments, the diffuser spreads the line beam 310 in the vertical and horizontal directions. In some embodiments, the divergence of the diffused line beam 310 may match the FOV of the LiDAR system 300 (e.g., 120 degrees by 32 degrees).

In some embodiments, the LiDAR system 300 includes one second transmitter 304. In some embodiments, the LiDAR system 300 includes one second transmitter 304 per set of first transmitters 104 (or set of first emitters) configured to scan different vertical regions of the system's FOV (e.g., array of 4, 8, 16, 32, or 64 transmitters or emitters). In some embodiments, the LiDAR system 300 includes one second transmitter 304 per first transmitter 104 (or emitter).

In some embodiments, the LiDAR system 300 activates a single receiver 106 to receive return signals in the short-range listening period after the transmitter 304 emits a laser signal 310. In such embodiments, the LiDAR system 300 may be able to detect the presence of an object within the near field, but may not be able to determine the precise location of the object (e.g., the vertical and horizontal coordinates of the object) within the FOV. In some embodiments, the LiDAR system 300 activates two or more receivers 106 (e.g., an array of 4, 8, 16, 32, or 64 receivers) to receive return signals in the short-range listening period after the transmitter 304 emits a laser signal 310. In such embodiments, the LiDAR system 300 may be able to detect the presence of an object within the near field, and able to determine at least the vertical coordinate(s) of the object within the FOV. In some embodiments, the LiDAR system 300 may activate the second transmitter once each time the system finishes scanning the entire FOV, once each time a first transmitter (or first emitter) finishes scanning a scan line (e.g., horizontal scan line) within the FOV, or once each time a first transmitter (or first emitter) scans a pixel within the FOV. Any of the foregoing configurations may be suitable for various applications of LiDAR system 300 (e.g., autonomous vehicle navigation).

Referring again to FIG. 3B, one of ordinary skill in the art will appreciate that the illustrated configuration of the near-field transmitter 304 may not provide full coverage of the LiDAR system's FOV at a range of 2 meters or less, because the near-field transmitter 304 is not positioned centrally with respect to the system's FOV. In some embodiments, the LiDAR system 300 may include a second near-field transmitter 304, which may be positioned proximate to location 308. Together, the illustrated near-field transmitter 304 and a second near-field transmitter positioned proximate to location 308 may provide full coverage of the system's FOV. In some embodiments, the two near-field transmitters may transmit pulses synchronously (e.g., with the two transmitters transmitting their pulses simultaneously or in an alternating sequence).

Advantageously, the timing of the firing of the transmitter 304 of the near-field LiDAR device with respect to the firing of the transmitter 104 of the far-field LiDAR device is selected, inter alia, to avoid dazzle interference. More particularly, the near-field transmitter 304 may be adapted to generate and emit a flash (e.g., illumination) signal 310 a predetermined amount of time before or after the generation and emission of light (e.g., illumination) signals 110 by the far-field transmitter 104.

Preferably, the flash signal 310 is emitted separately and distinctly from the (e.g., laser) light (e.g., illumination) signals 110 emitted by the transmitter 104 of the (e.g. primary) LiDAR device 102. Such emission may occur, for example, at the end of or at the beginning of every laser position (LPOS). Those of ordinary skill in the art can appreciate that the receiver 106 and control & data acquisition module 108 integrated into the LiDAR device 102, as well as the data analysis & interpretation module 109, may also be used to control the firing of the flash signals 310 by the (e.g., supplemental) transmitter 304 of the (e.g., secondary) hybrid LiDAR device 302 and to receive and process the return flash signals 314. Optionally, in some embodiments, the (e.g., secondary) hybrid LiDAR device 302 may be structured and arranged to include a separate receiver (not shown), control & data acquisition module (not shown), and/or data analysis & interpretation module (not shown).

In embodiments, aspects of the techniques described herein (e.g., timing the emission of the transmitted signal and the flash signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price.

The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, a touchscreen, and/or a video display. The computing system may also include one or more buses operable to transmit communications between the various hardware components.

Figure 4:
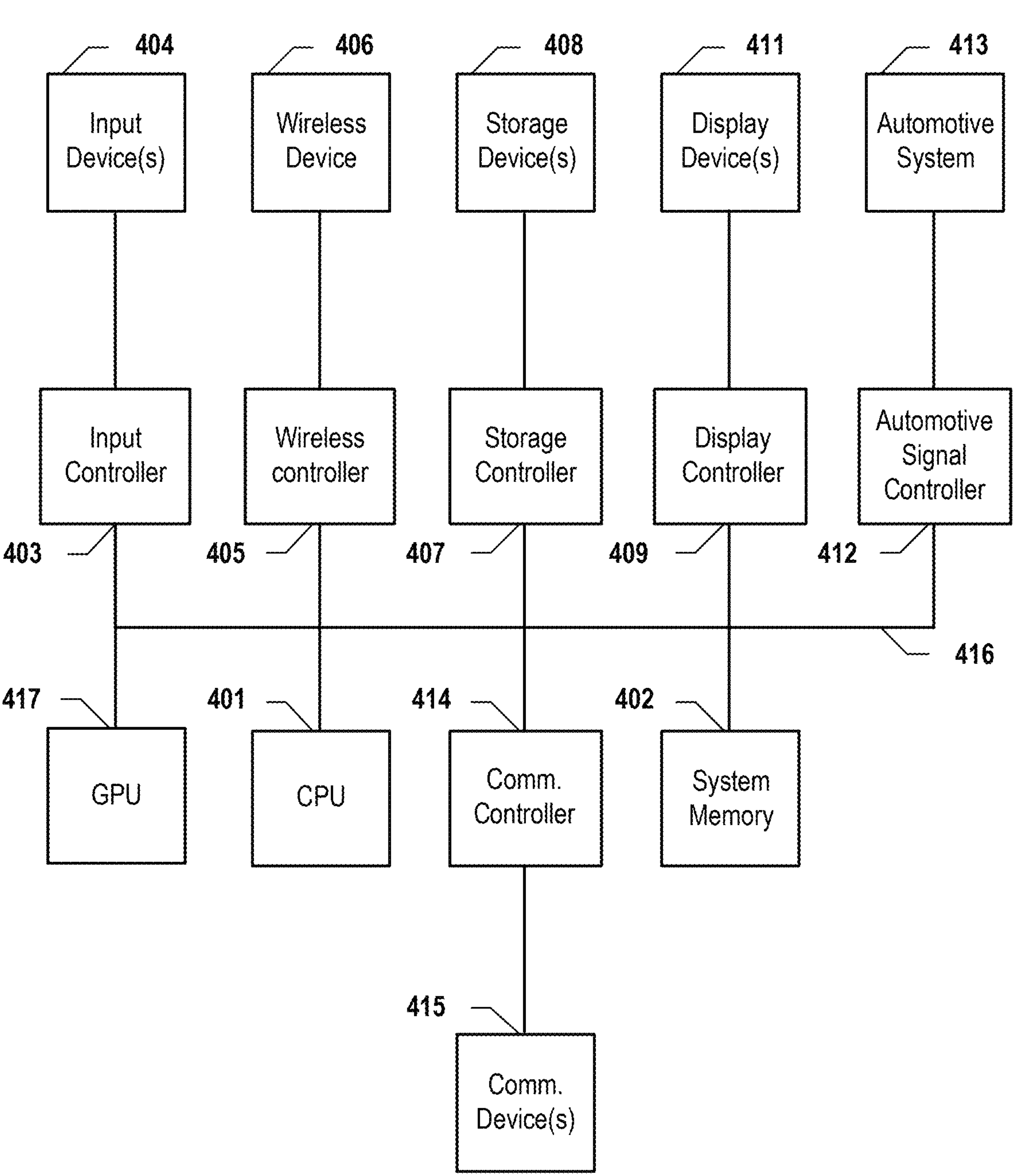
FIG. 4 shows a block diagram of a computing device/information handling system, in accordance with some embodiments.

FIG. 4 depicts a simplified block diagram of a computing device/information handling system (or computing system) according to embodiments of the present disclosure. It will be understood that the functionalities shown for system 400 may operate to support various embodiments of an information handling system—although it shall be understood that an information handling system may be differently configured and include different components.

As illustrated in FIG. 4, system 400 includes one or more central processing units (CPU) 401 that provide(s) computing resources and control(s) the computer. CPU 401 may be implemented with a microprocessor or the like, and may also include one or more graphics processing units (GPU) 417 and/or a floating point coprocessor for mathematical computations. System 400 may also include a system memory 402, which may be in the form of random-access memory (RAM), read-only memory (ROM), or both.

A number of controllers and peripheral devices may also be provided. For example, an input controller 403 represents an interface to various input device(s) 404, such as a keyboard, mouse, or stylus. There may also be a scanner controller 405, which communicates with a scanner 406. System 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the techniques described herein. Storage device(s) 408 may also be used to store processed data or data to be processed in accordance with some embodiments. System 400 may also include a display controller 409 for providing an interface to a display device 411, which may be a cathode ray tube (CRT), a thin film transistor (TFT) display, or other type of display. The computing system 400 may also include an automotive signal controller 412 for communicating with an automotive system 413. A communications controller 414 may interface with one or more communication devices 415, which enables system 400 to connect to remote devices through any of a variety of networks including the Internet, a cloud resource (e.g., an Ethernet cloud, an Fiber Channel over Ethernet (FCOE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

Operation of Passive Listening

Having described a hybrid LiDAR system 300 capable of compensating for dazzle and detecting objects in the near field (e.g., within 1 or 2 meters of the system 300, or, more generally, within a short-range scan area that is spatially distant from the medium- and long-range scan areas), an alternative process that may be performed by a hybrid LiDAR system 300 is now described. This alternative process may involve the use of active and passive listening periods for medium- to long-range (i.e., "far-field") and short-range (i.e., "near-field") scan areas. As described herein, a hybrid LiDAR system 300 may include the far-field transmitter 104, receiver 106, and control & data acquisition module 108, which may be configured to operate as a far-field LiDAR device (e.g., channel), capable of providing data from medium- to long-range scan areas. A hybrid LiDAR system 300 may include the near-field transmitter 304, receiver 106, and control & data acquisition module 108, which may be configured to operate as a near-field LiDAR device (e.g., channel), capable of providing data from short-range scan areas. In some embodiments, far-field transmitter 104 and a near-field transmitter 304 may share a receive path for a receiver 106, such that the receiver 106 is configured to receive and detect return signals corresponding to transmissions by both the far-field transmitter 104 and a near-field transmitter 304.

In some embodiments, to detect the presence of objects in the near-field and/or the far-field in the system's FOV, the LiDAR system 300 may monitor for return signals (e.g. return signals 114 and 314) during both a long-range listening period and a short-range listening period of the system's operating period. To detect the presence of an object within the far-field, the LiDAR system 300 may activate a far-field transmitter 104 (or set of far field-transmitters 104) to emit one or more optical signals 110. The LiDAR system 300 may activate a receiver 106 (or set of receivers 106) to receive and detect one or more return signals (e.g., return signal 114) during a long-range listening period. In some cases, the activation of the receiver(s) 106 may occur approximately at a time just after the far-field transmitter 104 emits an optical signal 1010 In some cases, the activation of the receiver(s) 106 may occur approximately at a time just before or at the same time as when the far-field transmitter 104 emits an optical signal 11-. To detect the presence of an object within the near-field, the LiDAR system 300 may activate near-field transmitter 304 to emit an optical signal 310. The LiDAR system 300 may activate one or more receivers 106 to receive and detect return signals (e.g., return signal 314) during a short-range listening period. In some cases, the activation of the receiver(s) 106 may occur approximately at a time just after the near-field transmitter 304 emits an optical signal 310. In some cases, the activation of the receiver(s) 106 may occur approximately at a time just before or at the same time as when the near-field transmitter 304 emits an optical signal 310. In some cases, for a particular receiver 106, a long-range listening period and a short-range listening period may be approximately consecutive (i.e. back-to-back), where temporal separation between listening periods may be minimal (e.g., approximately 0 seconds). However, in conventional LiDAR devices, consecutive listening periods introduce potential for aliasing of return signals reflecting from objects (e.g., objects with high reflectivity) located beyond a system's maximum intended range.

In some embodiments, for a long-range listening period that precedes a short-range listening period with minimal temporal separation at a shared receiver 106, the far-field transmitter 104 may emit an optical signal 110 and a receiver 106 may receive and detect a corresponding return signal 114 during the short-range listening period, where the return signal 114 is reflected from an object beyond the system's maximum intended range. In conventional LiDAR devices, because the return signal 114 is detected during the short-range listening period, the propagation delay of the return signal 114 may be identified by the LiDAR system 300 as corresponding to an emission of the optical signal 310 by the near-field transmitter 304, causing the return signal 114 to be identified as corresponding to an object in the near-field, rather than being appropriately identified as corresponding to an object in the far-field beyond the system's maximum intended range. To mitigate the return signal 114 from aliasing as a return signal 314, the LiDAR system 300 may be configured to operate with passive listening during one or more short-range listening periods. As a part of passive listening, the LiDAR system 300 may compare return signals detected by the receiver 106 during active and passive short-range listening periods. During (or immediately prior to) an active short-range listening period, a near-field transmitter 304 may emit an optical signal 310 and a receiver 106 may monitor for return signals (e.g., reflecting from objects in the far- and near-field) for the duration of the listening period. During (or immediately prior to) a passive short-range listening period, a near-field transmitter 304 may be configured to be inactive and a receiver 106 may monitor for return signals (e.g., reflecting from objects in the far-field) for the duration of the listening period.

In some embodiments, based on depth of the system's FOV (e.g., far-field and near-field), the LiDAR system 300 may compare return signal data (e.g., received and detected return signal data collected during a listening period) sampled by a receiver 106 corresponding to active and passive short-range listening periods. In some cases, the comparison may include executing anti-correlation operations to filter out return signals 114 from the active return signal data that alias as return signals 314. In some cases, the comparison may include executing positive correlation operations to filter out erroneous return signal data from the active return signal data, where erroneous return signal data may correspond to the return signals originating from neither the transmitter 104 nor the transmitter 304. By comparing the active and passive return signal data, the LiDAR system 300 may identify and filter out aliased return signals from active return signal data corresponding to a particular short range-listening period, such that aliased return signals received and detected during the short-range listening period are not misidentified as corresponding to an object in the near-field (and are not provided to a connected computing device/information handling system). In some embodiments, based on identifying and filtering out aliased return signals from active return signal data, the LiDAR system 300 may attribute the aliased return signals as corresponding to an object or objects in the far-field (e.g., based on a distance and/or intensity of each aliased return signal). As used herein and described with respect to FIG. 5 below, "passive return signal data" may correspond to return signal data collected during a passive short-range listening period 526 and "active return signal data" may correspond to return signal data collected during an active short-range listening period 516.

Figure 5:
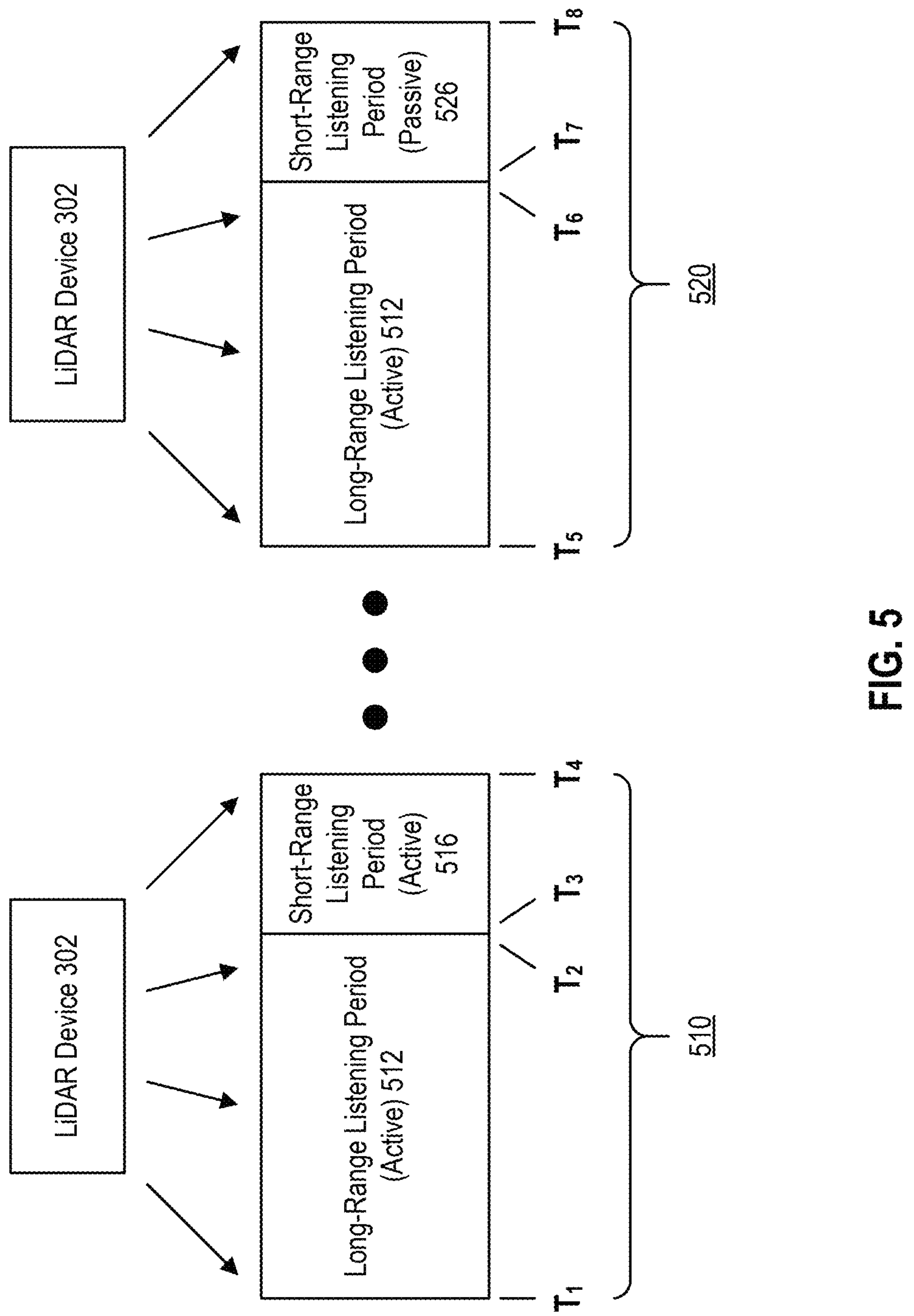
FIG. 5 shows an illustration of an exemplary operating period for a channel of a hybrid LiDAR system, in accordance with some embodiments.

Referring to FIG. 5, an exemplary operating period of a LiDAR device 302 of a hybrid LiDAR system 300 is shown in accordance with some embodiments. In some embodiments, a LiDAR device 302 may include the far-field transmitter 104 (or a set of far-field transmitters 104), the near-field transmitter 304, and the receiver 106 (or a set of receivers 106), where at least one receiver 106 is shared as a common receive path for both a far-field transmitter 104 and a near-field transmitter 304. In some cases, the far-field transmitter 104 and near-field transmitter 304 may share the receiver 106, such that the receiver 106 may receive and detect return signals corresponding to optical signals (110, 310) emitted by the far-field transmitter 104 and near-field transmitter 304. As described herein, the hybrid LiDAR system 300 may include the LiDAR device 302 (or a set of LiDAR devices 302) and the control & data acquisition module 108 may control the LiDAR device 302.

In some embodiments, a LiDAR device 302 with a shared receive path (e.g., a shared receiver 106) for a far-field transmitter 104 and a near-field transmitter 304 may operate according to an active operating period 510 or a passive operating period 520, which are each characterized based on whether the transmitter 304 emits an optical signal 310. An "active operating period" 510 may correspond to a time period where both a far-field transmitter 104 (or set of transmitters 104) and a near-field transmitter 304 generate and emit optical signals 110 and 310 respectively. An active operating period 510 may include an active long-range listening period 512 and an active short-range listening period 516. During an active long-range listening period 512, a transmitter 104 (or set of transmitters 104) may emit an optical signal 110 and a receiver 106 (or set of receivers 106) may monitor for return signals (e.g., return signals 114) reflected by objects (e.g., objects 112) in the system's scan area (e.g., medium-range scan area and/or long-range scan area). In an example, during an active long-range listening period 512, a transmitter 104 (e.g., a pixel laser) of a set of transmitters 104 may scan a pixel in the system's FOV and a receiver 106 may detect and receive a return signal 114 from an object in the scan area. In certain embodiments, a particular transmitter 104 may emit two or more optical signals 110 (e.g., in a configured sequence), such that the receiver 106 may receive and detect two or more return signals 114 in a sequence corresponding to the two or more optical signals 110.

During an active short-range listening period 516, a near-field transmitter 304 may emit an optical signal 310 and a receiver 106 may "listen for" return signals (e.g., return signals 314) reflected by objects (e.g., objects 312) in the scan area (e.g., short-range scan area and medium- to long-range scan areas for the aliased return signals). As used herein, a receiver "listens for" return signals when the receiver's optical detector is activated. In an example, after an active long-range listening period 512 and during an active short-range listening period 516, a transmitter 304 (e.g., a flash transmitter) may scan the system's FOV and a receiver 106 may detect and receive a return signal 314 from an object in the scan area.

In some embodiments, during an active operating period 510, an optical signal 110 may reflect from an object 112 located beyond the maximum intended range of the far-field transmitter 104, such that a return signal 114 is detected by the shared receiver 106 during the active short-range listening period 516 (rather than being detected during the active long-range listening period 512). Such a return signal 114 may be known as an aliased return signal, as the return signal 114 may correspond to an optical signal 110 transmitted by a transmitter 104 and may be detected during the active short-range listening period 516, causing the return signal 114 to alias as a return signal 314. Conventional LiDAR devices may attribute the aliased return signal to reflecting from an object (e.g., object 312) within the short-range scan area, where the distance for the aliased return signal is determined based on an optical signal 310 emitted by the transmitter 304. The LiDAR system 300 may execute post-processing techniques (e.g., filtering operations based on positive correlation and anti-correlation) to identify and remove the aliased return signals and other noise from active return signal data as described herein.

In some embodiments, an active long-range listening period 512 of an active operating period 510 may begin before, during, or after the far-field transmitter 104 emits an optical signal 110. In an example, the active long-range listening period 512 may begin approximately at a time just after a far-field transmitter 104 emits an optical signal 110. An active long-range listening period 512 may end at a time configured based on a propagation delay for each return signal corresponding to the optical signal 110 and a maximum nominal (e.g., intended) range of the LiDAR system 300. The active long-range listening period 512 may begin at time $T_1$ and may end at time $T_2$. An active short-range listening period 516 may begin before, during, or after the near-field transmitter 304 emits an optical signal 310. In an example, the active short-range listening period 516 may begin approximately at a time just after a near-field transmitter 304 emits an optical signal 310. An active short-range listening period 516 may end at a time configured based on a propagation delay of return signals corresponding to the optical signal 310 and the maximum nominal (e.g., intended) range for the short-range scan area of the LiDAR system 300. The active short-range listening period 516 may begin at time $T_3$ and may end at time $T_4$. In some cases, the time $T_3$ may be equivalent to or after the time $T_2$. Any difference between the time $T_2$ and the time $T_3$ may be known as a temporal separation between listening periods. In an example, the temporal separation between listening periods may be an idle-time for a far-field transmitter 104 and/or a near-field transmitter 304.

In some embodiments, a passive operating period 520 may correspond to a period during which the far-field transmitter 104 (or set of far-field transmitters 104) emits an optical signal 110 and the near-field transmitter 304 does not emit an optical signal 310 (e.g., due to being inactive). A passive operating period 520 may include an active long-range listening period 512 and passive short-range listening period 526. As described herein, during an active long-range listening period 512, a far-field transmitter 104 (or set of far-field transmitters) may emit an optical signal 110 and the receiver 106 (or set of receivers 106) may listen for return signals (e.g., return signals 114) reflected by objects (e.g., objects 112) in the scan area (e.g., the medium-range scan area and/or long-range scan area). During a passive short-range listening period 526, a near-field transmitter 304 may not emit an optical signal 310 and the receiver 106 may listen for return signals (e.g., return signals 114) reflected by objects (e.g., objects 112) in the scan area (e.g., the medium-range and long-range scan areas). In an example, during an active or passive short-range listening period (516, 526), the receiver 106 may receive and detect return signals 114 corresponding to the optical signal 110, where the return signals 114 have propagation delay greater than the duration of an active long-range listening period 512. In some cases, during a passive operating period 520, an optical signal 110 may reflect from an object 112 that is beyond the maximum intended range of the far-field transmitter 104, resulting in a return signal 114 that is detected by the shared receiver 106 during the passive short-range listening period 526 (rather than being contained in the active long-range listening period 512). Such a return signal 114 may be known as an aliased return signal, as the return signal 114 may correspond to an optical signal 110 transmitted by a transmitter 104 and may be detected during the active short-range listening period 516, causing the return signal 114 to alias as a return signal 314 as described herein.

In some embodiments, an active long-range listening period 512 of a passive operating period 520 may begin before, during, or after a far-field transmitter 104 emits an optical signal 110. In an example, the active long-range listening period 512 may begin approximately at a time just after a far-field transmitter 104 emits an optical signal 110. The active long-range listening period 512 may begin at time $T_5$ and may end at time $T_6$. A passive short-range listening period 526 may begin before, during, or after the near-field transmitter 304 emits an optical signal 310. In an example, the passive short-range listening period 526 may begin approximately at a time just after the end of the active long-range listening period 512. The passive short-range listening period 526 may begin at time $T_7$ and may end at time $T_8$. In some cases, the time $T_7$ may be equivalent to or after the time $T_6$. Any difference between the time $T_6$ and the time $T_7$ may be known as temporal separation between listening periods.

In some embodiments, the near-field transmitter 304 may not emit an optical signal 310 as frequently as the far-field transmitter 104 for a shared receiver 106. In an example, to obtain the same point resolution for point (e.g., pixel) measurements, the near-field transmitter 304 may not emit an optical signal 310 as frequently as the far-field transmitter 104, as maintaining the same point resolution at shorter and longer ranges requires fewer distance measurements at shorter ranges. Accordingly, a LiDAR device 302 of the LiDAR system 300 may operate to scan the system's FOV according to one or more passive operating periods 520 corresponding to each active operating period 510. For example, a LiDAR device 302 may scan the FOV by scanning the FOV using an active operating period 510 followed by any suitable number (e.g., 2, 6, 14, 30 etc.) of passive operating periods 520, such that return signals are sampled by a receiver 106 in one active short-range listening period 516 for any suitable number (e.g., 2, 6, 14, 30, etc.) of passive short-range listening periods 526. Additionally, for example, for a series of 16 consecutive operating periods 510 or 520, operating periods 1-15 may be passive operating periods 510, while a $16^{th}$ operating period may be an active operating period 520. Any suitable temporal relationship between active operating periods 510 and passive operating periods 520 may be used for one or more channels 520 included in the LiDAR system 300. For example, as shown in FIG. 5, an active operating period 510 may precede one or more passive operating periods 520. Alternately, for example, one or more passive operating periods 520 may precede an active operating period 510 (not shown in FIG. 5). In some embodiments, a LiDAR device 302 of the LiDAR system 300 may activate the near-field transmitter 304 (as a part of an active operating period 510) once each time the system 300 finishes scanning the entire FOV via one or more passive operating periods 520, once each time a far-field transmitter 104 finishes scanning a scan line (e.g., horizontal scan line) within the FOV via one or more passive operating periods 520, or once each time a far-field transmitter 104 scans a pixel within the FOV. In some embodiments, a short-range listening period (e.g., active short-range listening period 516 or passive short-range listening period 526) may precede a long-range listening period (e.g., active long-range listening period 512) with a respective active operating period 510 or passive operating period 520, such that a near-field transmitter 304 may emit an optical signal 310 within an operating period before a far-field transmitter 104 emits an optical signal 110 (not shown in FIG. 5).

In some embodiments, a hybrid LiDAR system 300 may be configured with a set of far-field transmitters 104, a corresponding set of receivers 106, and at least one near-field transmitter 304. Each transmitter 104 and corresponding receiver 106 may be assigned a particular channel identifier (e.g., channel number), where the transmitter 304 may be configured to share a receive path with each channel of the set of channels and where the transmitter may be configured to share a receive path with at least one channel of the set of channels during an operating period (e.g., active operating period 510 or passive operating period 520). A particular channel may include a transmitter 104 and a receiver 106, such that a transmitter 304 may be configured to share a receive path (e.g., receiver 106) of a particular channel. As an example, the hybrid LiDAR system 300 may include a set of 8 channels, where each of the 8 channels includes a transmitter 104 and receiver 106, as well as a transmitter 304 configured to operate with each receiver 106 of the set of channels. The channels may be configured to operate in a sequential (e.g., round-robin) order, where a single channel (e.g., transmitter 104 and receiver 106) of the set of channels operates according to an operating period (e.g., active operating period 510 or passive operating period 520) at a given time. The set of channels may sequentially cycle through active operating periods 510 and passive operating periods 520 according to their respective channel identifier. As an example, a first channel, second channel, and third channel may execute according to an active operating period 510 in a sequential order, where a transmitter 304 executes according to the active operating period 510 for the first, second, and third channels. By configuring the transmitter 304 to operate with each channel of the set of channels, a position of near-field objects/surfaces may be identified based on the respective orientation of each receiver 106 relative to the surrounding environment.

Method for Detection and Mitigation of Aliased Signals

Having described active and passive operating periods (510, 520) for a LiDAR system 300 that includes one or more LiDAR devices 302, a method of detecting and mitigating aliased return signals (and other channel noise/interference) is now described. As described herein, during operation of a LiDAR device 302 configured with consecutive listening periods at a shared receiver 106, a transmitter 104 may transmit an optical signal 110, which (in most cases) may result in return signals 114 that are detected and received by a receiver 106 during an active long-range listening period 512. But, in some cases, one or more return signals 114 may be detected and received during an active or passive short-range listening period (516, 526), which may alias as one or more return signals 314. Accordingly, the LiDAR system 300 requires a method to identify and mitigate aliased return signals resulting from using consecutive listening periods for a shared receiver 106.

In some embodiments, return signals (114, 314) may be received, detected, and processed within active and/or passive listening periods (510, 520). Because consecutive long-range and short-range listening periods for a shared receiver 106 can result in aliasing of return signals, the LiDAR system 300 may perform post-processing operations on return signal data sampled during the active and passive short-range listening periods (516, 526). In some cases, return signal data may include signal intensity and range data obtained over the duration of a listening period. Return signal data sampled during the active short-range listening period 516 may be known as "active return signal data" and return signal data sampled during the passive short-range listening period 526 may be known as "passive return signal data". The LiDAR system 300 may perform post-processing operations on a per channel/device basis for each LiDAR device 302 included in the LiDAR system 300. For example, for a LiDAR system 300 including a set of 16 LiDAR devices 302, the LiDAR system 300 may perform post-processing operations on return signal data sampled during active and passive short-range listening periods (516, 526) corresponding to each of the 16. LiDAR devices 300.

In some cases, active return signal data sampled during an active short-range listening period 516 may include aliased return signals 114 and return signals 314. In other cases, active return signal data may include only return signals 314. Active return signal data may also include noise/interference from the system's FOV. The LiDAR system 300 may perform positive correlation operations on present active return signal data sampled from a particular active short-range listening period 516 and active return signal data sampled from past and/or future active short-range listening periods 516 to identify common return signals (e.g., return signal(s) 114 and 314). To identify common return signals for the present active return signal data, the LiDAR system 300 may compare active return signal data sampled from a plurality of active short-range listening periods 516 to the present active return signal data sampled from the particular active short-range listening period 516. In some cases, the plurality of active short-range listening periods 516 may include the active short-range listening periods 516 that were most recently sampled by a LiDAR device 302 prior to the particular active short-range listening period 516. In an example, the plurality of active short-range listening periods 516 may be the two active short-range listening periods 516 that were most recently sampled by a LiDAR device 302 prior to the particular active short-range listening period 516. In some cases, the plurality of active short-range listening periods 516 may include past and/or future active short-range listening periods 516. For example, the plurality of active short-range listening periods 516 may include the two active short-range listening periods 516 before and after the sampling of the present active return signal data.

In some embodiments, the LiDAR system 300 (or a component (e.g., a data analysis & interpretation module 109) of the LiDAR system 300) may determine a positive correlation (e.g., a numerical indicator of positive correlation) between the present active return signal data sampled from a particular active short-range listening period 516 and active return signal data sampled from the plurality of active short-range listening periods 516. First return signal data may be positively correlated with second return signal data if the first and second return signal data include return signal(s) at similar temporal locations and/or return signal(s) at similar intensities. A first return signal of first return signal data may be positively correlated with a second return signal of the second return signal data if the first and second return signals have similar temporal locations within their respective listening periods and/or if the first and second return signals have similar intensities. Due to a temporal proximity of the particular active short-range listening period 516 and the plurality of active short-range listening periods 516, return signals 314 (and aliased return signals 114) included in active return signal data may have been sampled at similar temporal locations and intensities in each of the active short-range listening periods 516, such that there is a high degree of positive correlation between active return signal data for each of the active short-range listening periods 516. As an example, the present active return signal data sampled from a particular active short-range listening period 516 may be compared to active return signal data sampled from 2 previous active short-range listening periods 516 and 2 future active short-range listening periods 516.

In some embodiments, the LiDAR system 300 may determine a positive correlation between each return signal (114, 314) included in the present active return signal data sampled from a particular active short-range listening period 516 and the active return signal data sampled from the plurality of active short-range listening periods 516. The LiDAR system 300 may compare each determined positive correlation to a correlation threshold to filter one or more return signals (and noise). If a particular determined positive correlation exceeds (or equals) the correlation threshold, the LiDAR system 300 may allow the return signal (e.g., return signal 114 or 314) corresponding to the determined positive correlation to remain in the present active return signal data. If a particular determined positive correlation is less than the correlation threshold, the LiDAR system 300 may remove the return signal (e.g., return signal 114 or 314) corresponding to the determined positive correlation from the present active return signal data.

In some cases, passive return signal data sampled during a passive short-range listening period 526 may include aliased return signals 114 (and no return signals 314). In other cases, passive return signal data may not include any aliased return signals 114. The passive return signal data may not include return signals 314 reflected from objects in the system's short-range scan area, as a transmitter 304 is not configured to emit an optical signal 310 to scan the system's FOV during a passive short-range listening period 526. Since the passive return signal data lacks data corresponding to return signals 314 (e.g., originating from an optical signal 310), the LiDAR system 300 may perform anti-correlation operations on the present active return signal data using the passive return signal data to filter aliased return signals 114 (and other noise) from the present active return signal data. The LiDAR system 300 may perform anti-correlation operations on the present active return signal data corresponding to a particular active short-range listening period 516 based on passive return signal data to identify and filter aliased return signals 114 from the active return signal data. To identify the aliased return signals 114 in the present active return signal data, the LiDAR system 300 may compare the present active return signal data to passive return signal data sampled during a plurality of passive short-range listening periods 526. In some cases, the plurality of passive short-range listening periods 526 may include the short-range listening periods 526 that were most recently sampled by a LiDAR device 302. In an example, the plurality of passive short-range listening periods 526 may include each of the passive short-range listening periods 526 that were sampled since a previously sampled active short-range listening period 516. In some cases, the plurality of passive short-range listening periods 526 may include past and/or future passive short-range listening periods 526. For example, the LiDAR system 300 may compare the present active return signal data to passive return signal data corresponding to 15 passive short-range listening periods 526 that were sampled before and after the present active return signal data.

In some embodiments, the LiDAR system 300 may determine anti-correlation between the present active return signal data sampled from a particular active short-range listening period 516 and the passive return signal data sampled from the plurality of passive short-range listening periods 526. By anti-correlating the present active return signal data and the passive return signal data, the LiDAR system 300 may filter aliased return signals 114 (and noise/interference) that are present in both the active and passive return signal data from the present active return signal data. By filtering the aliased return signals 114 from the present active return signal data, the present active return signal data may include (approximately) only return signals 314 corresponding to objects in the short-range scan area of the LiDAR system 300. Due to a temporal proximity of the particular active short-range listening period 516 and the plurality of passive short-range listening periods 526, aliased return signals 114 included in both the present active return signal data and the passive return signal data may have been sampled at similar temporal locations and intensities in the different passive short-range listening periods 526, such that there is a high degree of positive correlation between the present active return signal data and the passive return signal data.

In some embodiments, the LiDAR system 300 may determine a positive correlation for each return signal (114, 314) included in the present active return signal data with respect to other active return signal data. The LiDAR system 300 may determine an anti-correlation for each return signal (114, 314) included in the present active return signal data with respect to each aliased return signal 114 included in the passive return signal data. The LiDAR system 300 may compare each determined positive correlation to a correlation threshold to filter aliased return signals 114 from the present return signal data, and similarly for the anti-correlation case (e.g., by comparing a determined anti-correlation to an anti-correlation threshold). For example, if a particular determined anti-correlation exceeds (or equals) the anti-correlation threshold, the LiDAR system 300 may remove the return signal (e.g., return signal 114) corresponding to the determined anti-correlation from the present active return signal data with respect to the passive return signal data. If a particular determined anti-correlation is less than the anti-correlation threshold, the LiDAR system 300 may allow the return signal (e.g., return signal 314) corresponding to the determined anti-correlation to remain in the present active return signal data.

In some embodiments, the LiDAR system 300 may use both positive correlation and anti-correlation post-processing operations to filter return signal data sampled from an active short-range listening period 516. In other embodiments, the LiDAR system 300 may use only anti-correlation post-processing operations to filter return signal data sampled from an active short-range listening period 516. The LiDAR system 300 may perform positive correlation and/or anti-correlation operations for each LiDAR device/channel 302 included in the LiDAR system 300, where each LiDAR device 302 is configured to use a shared receiver 106 to detect return signals (114, 314) originating from a transmitter 104 and a transmitter 304. As described herein, active return signal data and passive return signal data sampled from active and passive short-range listening periods (516, 526) respectively may be used to perform post-processing operations on a per channel/device basis, such that a particular LiDAR device 302 uses active and passive return signal data corresponding to its shared receiver 106 to perform positive correlation and/or anti-correlation operations on active return signal data.

Figure 6:
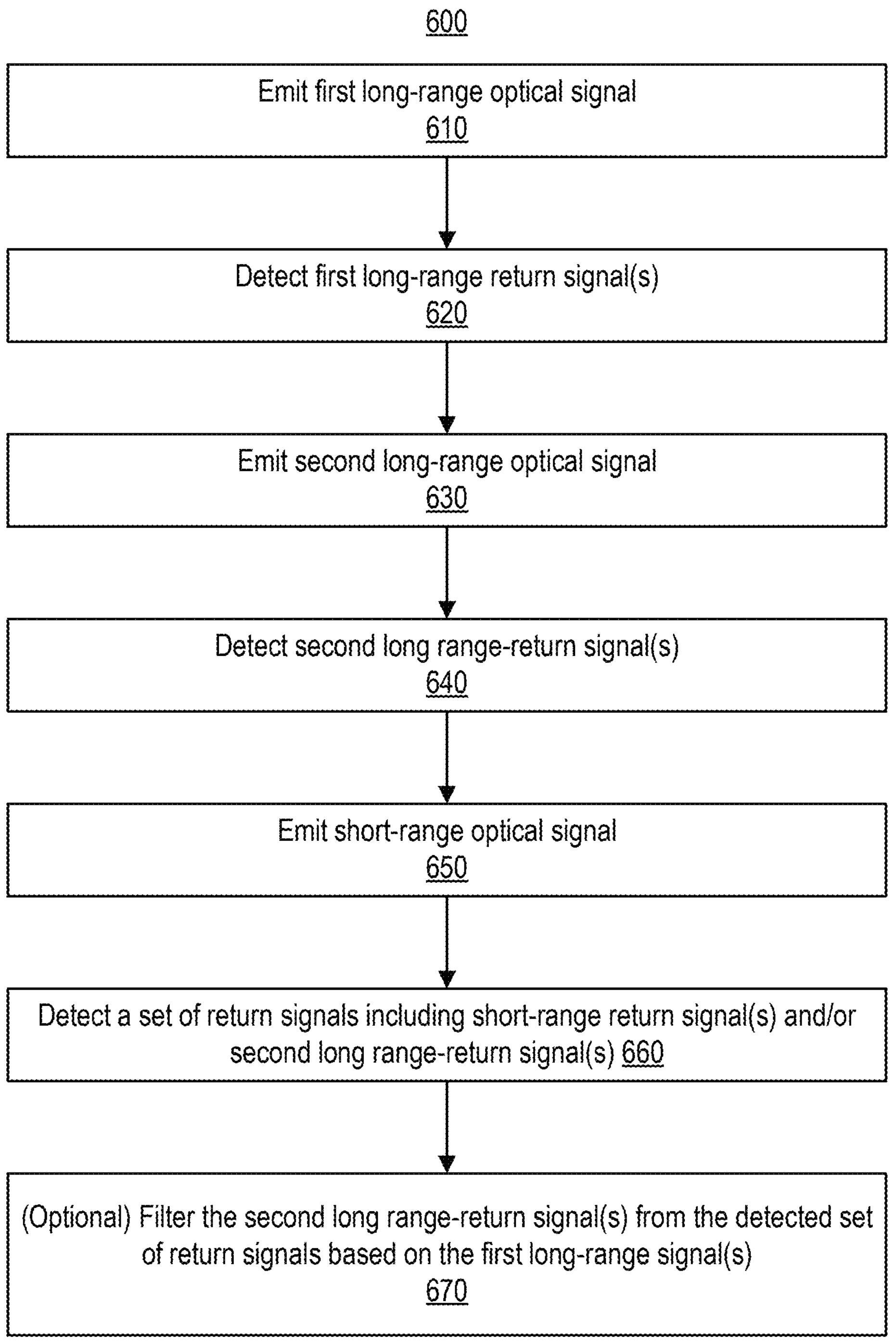
FIG. 6 shows a flow chart of a method of filtering aliased return signals, in accordance with some embodiments.

Referring to FIG. 6, a flow chart of a method 600 of filtering aliased return signals from a short-range listening period is shown, in accordance with some embodiments. The method 600 is suitable for filtering aliased return signals (and other noise) from active return signal data sampled from an active short-range listening period 516 for a far-field transmitter 104 and a near-field transmitter 304 sharing a receive path (e.g., a receiver 106). Some embodiments of the method 600, the use of active operating periods 510, and the use of passive operating periods 520 may enable an ability to segment operating periods (and corresponding listening periods) into multiple range measurement windows for a single receive path, such that idle time between short-range and medium- to long-range operation may be reduced (e.g., minimized) and pulse repetition frequency (PRF) may be increased. By reducing idle time and increasing PRF, resolution and performance of the LiDAR system 300 may be improved. An output of the method 600 may include a filtered active return signal data (e.g., signal intensity and temporal location data for return signal(s) received and detected during a listening period 516) that may be suitable to provide to a system (e.g., system 400) for further processing. For simplicity, the following paragraphs describe the method 600 with reference to a single LiDAR device/channel 302 of the LiDAR system 300, and describe the method 600 with reference filtering active return signal data sampled from a particular active short-range listening period 516, where a single passive operating period 520 precedes a single active operating period 510. However, one of ordinary skill in the art will appreciate that the steps 610-670 of the method 600 may be performed in parallel by two or more LiDAR devices/channels 302 of the LiDAR system 300 and may be performed for active return signal data sampled from two or more active short-range listening periods 516. In an example, two or more LiDAR devices/channels 302 may perform the method 600 if the LiDAR devices/channels 302 are spatially separated (e.g., via angular separation of transmitters (104, 304) and receivers 106). Two or more LiDAR devices/channels 302 may perform the method 600 with a temporal offset, such that an active short-range listening period 516 of a first LiDAR device 302 occurs during a passive short-range listening period 526 of a second LiDAR device 302 that is adjacent and/or proximal to the first LiDAR device 302. Such a configuration facilitates detection of aliased signals at the first and second LiDAR devices 302, as well as detection and mitigation of return signal cross-talk between channels of each LiDAR device 302. Further, one of ordinary skill in the art will appreciate that the method 600 may be performed such that any suitable number of passive operating periods 520 may precede or antecede one or more active operating periods 510. In some embodiments, the method 600 may be repeated such that active return signal data sampled from one or more active short-range listening periods 516 may be used for positive correlation operations as described herein.

In some embodiments, the method 600 involves (1) emitting, by transmitter 104, an optical signal 110 to detect objects at a medium- to long-range, (2) detecting, by a receiver 106, one or more return signals 114 in an active long-range listening period 512 and a passive short-range listening period 526, (3) emitting, by the transmitter 104, a second optical signal 110 to detect objects at a medium- to long-range, (4) detecting, by the receiver 106, one or more return signals 114 in an active long-range listening period 512, (5) emitting, by a transmitter 304, an optical signal 310 to detect objects at a short-range, (6) detecting, by the receiver 106, a set of return signals including one or more return signals 114 and/or one or more return signals 314 during an active short-range listening period 516, and (7) filtering the one or more (e.g., aliased) return signals 114 from the set of return signals included in the active return signal data sampled during the active short-range listening period 516.

Referring to the method 600, at step 610, a far-field transmitter 104 of a LiDAR device 302 may emit an optical signal 110 to detect objects at a medium- to long-range in the system's FOV. The transmitter 104 may emit the optical signal 110 as a part of a passive operating period 520. In an example, the transmitter 104 may emit the optical signal 110 just prior to the beginning of an active long-range listening period 512 in a passive operating period 520. In some cases, the transmitter 104 may be a pixel laser configured to scan a pixel in the system's FOV using the optical signal 110. In some embodiments, the transmitter 104 may emit two or more first optical signals 110 in a configured sequence. As an example, the transmitter 104 may emit a series of first optical signals 110 in a unique "codeword" sequence (e.g., defined by the temporal separation between each optical signal 110, the amplitudes of the optical signals 110, and/or other attributes of the optical signals 110) that may be identified by a receiver 106 of the LiDAR device 302 and may be identified by receivers 106 of other LiDAR devices 302 in the proximity of the LiDAR device 302 executing the method 600. The other LiDAR devices 302 may filter out received return signals that correspond to the unique codeword.

At step 620, a receiver 106 of the LiDAR device 302 may detect one or more first return signals 114. The LiDAR device 302 may detect the first return signal(s) 114 during an active long-range listening period 512 of a passive operating period 520. The LiDAR device 302 may detect the first return signal(s) 114 during an active long-range listening period 512 and a passive short-range listening period 526 of a passive operating period 520. In some cases, one or more of the first return signal(s) 114 may be detected during the passive short-range listening period 526, such that the first return signal(s) 114 are aliased. As described herein, return signals (e.g., first return signal(s) 114) detected during the passive short-range listening period 526 may be known as passive return signal data. One or more (e.g., aliased) return signals 114 may be detected during the passive-short range listening period 526 based on the LiDAR device 302 having minimal (or no) temporal separation between the active long-range listening period 512 and the passive short-range listening period 526 in the passive operating period 520.

At step 630, the transmitter 104 of a LiDAR device 302 may emit a second optical signal 110 to detect objects at a medium- to long-range in the system's FOV. The transmitter 104 may emit the second optical signal 110 as a part of an active operating period 510. In an example, the transmitter 104 may emit the optical signal 110 just prior to the beginning of an active long-range listening period 512 in an active operating period 510. In some embodiments, the transmitter 104 may emit two or more second optical signals 110 in a configured sequence. As an example, the transmitter 104 may emit a series of second optical signals 110 in a unique "codeword" sequence (e.g., defined by the temporal separation between each optical signal 110, the amplitudes of the optical signals 110, and/or other attributes of the optical signals 110) that may be identified by a receiver 106 of the LiDAR device 302 and may be identified by receivers 106 of other LiDAR devices 302 in the proximity of the LiDAR device 302 executing the method 600. The other LiDAR devices 302 may filter out received return signals that correspond to the unique codeword. The sequence of the second optical signals 110 may correspond to the sequence of the first optical signals 100 (as in step 610).

At step 640, the receiver 106 of the LiDAR device 302 may detect one or more second return signals 114. The LiDAR device 302 may detect the one or more second return signals 114 during an active long-range listening period 512 of an active operating period 510. In some cases, one or more of the second return signal(s) 114 may not be detected during the active long-range listening period 512, as one or more of the second return signal(s) 114 may be reflected from objects located further than the maximum intended range of the transmitter 104. Second return signal(s) 114 reflected from objects further than the maximum intended range of the transmitter 104 may have a round-trip-time greater than the duration of the active long-range listening period 512, resulting in the second return signal(s) 114 returning to the receiver 106 at a time (e.g., during the active short-range listening period 516) after the active long-range listening period 512.

At step 650, a near-field transmitter 304 of the LiDAR device 302 may emit an optical signal 310 to detect objects at a short-range in the system's FOV. The transmitter 304 may emit the optical signal 310 as a part of an active operating period 510 (e.g., after the transmitter 104 emitted an optical signal 110). In an example, the transmitter 304 may emit the optical signal 110 just after the end of an active long-range listening period 512 and just prior to the beginning of an active short-range listening period 516 in an active operating period 510. In some cases, the transmitter 104 may be a flash laser configured to scan a near-field in the system's FOV using the optical signal 310.

At step 660, the receiver 106 of the LiDAR device 302 may detect a set of return signals, where the set includes one or more return signals 314 and/or second return signals 114. The LiDAR device 302 may detect the set of return signals include the one or more return signals 314 and/or the second return signals 114 during an active short-range listening period 516 of an active operating period 510. As described herein, one or more return signals 314 may correspond to one or more objects located in the near-field of the system's FOV. The second return signal(s) 114 may correspond to the second optical signal 110 emitted by the transmitter 104, where the second return signal(s) 114 were reflected from objects located further than the maximum intended range of the transmitter 104. The second return signal(s) 114 detected during the active short-range listening period 516 may be aliased return signals, which may appear as objects located in the near-field of the system's FOV unless the aliased return signals are identified and filtered from the active return signal data as described below.

At step 670, the LiDAR system 300 may optionally filter the second (e.g., aliased) return signal(s) 114 from the detected set of return signals including the return signal(s) 314 and/or the detected second return signal(s) 114 (as detected in step 660) based on the first return signal(s) 114 detected in the passive short range-listening period 526 (as detected in step 620). The LiDAR system 300 may filter the second return signal(s) 114 (and noise) from the set of return signals included in the active return signal data (e.g., the detected return signal(s) 310 and second return signal(s) 114) using positive correlation and/or anti-correlation operations as described herein. Since the first return signal(s) 114 detected in the passive short-range listening period 526 (as in step 620) can be representative of the aliased return signals (e.g., second return signal(s) 114) present in the active return signal data, the LiDAR system 300 may use anti-correlation operations for the active return signal data and the passive return signal data to filter the second return signal(s) 114 from the active return signal data. In an example, the LiDAR system 300 may identify common return signal intensity peaks and temporal locations (e.g., the second return signal(s) 114) between the active and passive return signal data and may filter the common return signal intensity peaks from the active return signal data. In some cases, the LiDAR system 300 may not filter the second (e.g., aliased) return signal(s) 114 from the detected set of return signals if the second return signal(s) are not included in the detected set of return signals. The LiDAR system 300 may not filter the second return signal(s) 114 from the detected set of return signals based on a determined positive correlation and/or anti-correlation that does not exceed correlation and/or anti-correlation thresholds. A result of filtering the second return signal(s) 114 from the active return signal data may be filtered active return signal data including only the return signal(s) 310 corresponding to objects in the short-range scan area. Such filtered active return signal data may be provided to a computing device/information handling system (e.g., system 400) for further processing and analysis, where the filtered active return signal data includes received signal intensity information for the duration of the active short-range listening period 516.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Exemplary Use Cases

In some embodiments, a LiDAR system 300 including one or more LiDAR devices/channels 302 may operate in accordance with one or more additional use cases with respect to active operating periods 510 and passive operating periods 520. In some cases, the additional use cases may involve a single LiDAR device/channel 302 or multiple LiDAR devices/channels 302. A first use case may involve a single LiDAR device/channel 302, where the LiDAR channel/device 302 operates with an active operating period 510 preceding a passive operating period 520. During the active long-range listening periods 512, the transmitter 104 may be configured to emit a sequence of two or more optical signals 110 in a particular "codeword" sequence. During the active short-range listening period 516, the transmitter 304 may be configured to emit a single optical 310. Based on execution of an active operating period 510 and a passive operating period 520, the LiDAR system 300 may perform the method 600 with anti-correlation operations (e.g., described with respect to step 670). Based on the method 600, the LiDAR system 300 may identify a subset of the sequence of return signals 114 corresponding to the emitted sequence of optical signals 110 during the active short-range listening period 516 and the passive short-range listening period 526. Further, based on the method 600, the LiDAR system 300 may identify a subset of the sequence of return signals 114 corresponding to the emitted sequence of optical signals 110 during the passive short-range listening period 526, such that the LiDAR system may filter the subset of the sequence of return signals 114 from the passive return signal data sampled during the passive short-range listening period 526.

In some embodiments, a second use case may involve multiple (e.g., two) LiDAR devices/channels 302, where a first LiDAR channel/device 302 operates with an active operating period 510 preceding a passive operating period 520 and a second LiDAR channel/device operates with a passive operating period 520 preceding an active operating period 510. The first and second LiDAR channels/devices 302 may operate with parallel optical signal emissions (i.e. firings), where there is a configured angular separation between the first and second LiDAR channels/devices 302. Accordingly, the first LiDAR channel/device 302 may operate with an active operating period 510 while the second LiDAR channel/device 302 operates with a passive operating period, such that the first LiDAR channel/device 302 operates with an active short-range listening period 516 while the second LiDAR channel/device 302 operates with a passive short-range listening period 526. During the active long-range listening periods 512, the transmitters 104 of the first and second LiDAR channels/devices 302 may be configured to emit a sequence of two or more optical signals 110 in "codeword" sequences in parallel. Based on the parallel optical signal 110 emissions, the receivers 106 of the first and second LiDAR channels/devices may experience channel "cross talk", whereby optical signals 110 and/or return signals 114 from a different LiDAR device/channel 302 are received at the respective receiver 106. Accordingly, the first and second LiDAR devices/channels 302 may operate according to the method 600 with a temporal offset to adhere to the temporal orientation of operating periods described above, such that the first and second LiDAR devices/channels 302 may filter return signals 114 and 314 from their respective passive return signal data that correspond to a different LiDAR device 302 and may identify their respective "codeword" sequences. The first and second LiDAR devices/channels 302 may use anti-correlation operations as described herein to filter both aliased return signals 114 and return signals 114 corresponding to a different LiDAR device/channel 302 (e.g., that fires optical signals 110 in parallel). Any suitable number of LiDAR channels/devices 302 may operate with parallel firings and filtering as described herein.

In some embodiments, a third use case may involve a single LiDAR device/channel 302, where the LiDAR channel/device 302 operates with consecutive active operating periods 510 such that the LiDAR system 300 may operate with continuous listening (e.g., with minimal or no temporal separation between active operating periods 510). During the active long-range listening periods 512 of the consecutive active operating periods 510, the transmitter 104 may be configured to emit a sequence of two or more optical signals 110 in a "codeword" sequence. During the active short-range listening period 516, the transmitter 304 may be configured to emit a single optical 310. Based on consecutive execution of active operating periods 510, the LiDAR system 300 may identify return signals 114 corresponding to the "codeword" sequence that cross the temporal boundaries of different active operating periods 510. As an example, for a first active operating period 510 that precedes a second active operating period 510, after the LiDAR channel/device 302 emits a sequence of optical signals 110 during a long-range listening period 512 of the first active operating period 510, at least some of the emitted sequence of optical signals 110 may reflect from objects in the far-field beyond the maximum intended range, such that the return signals 114 are detected during the active long-range listening period 512 of the second active operating period 510. Accordingly, the LiDAR system 300 may detect such aliased return signals 114 based on the distinct "codeword" sequences corresponding to the first and second operating periods 510. In some cases, use of consecutive operating periods 510 may allow for range extension for a first operating period 510 that precedes a second operating period 510, such that the second operating period 510 is used by the LiDAR system 300 to further identify return signals 114 returning from objects beyond the intended range of the transmitter 104. In other cases, use of consecutive operating periods 510 may allow for interference mitigation for a second operating period 510 that is positioned after a first operating period 510, such that the LiDAR system 300 uses the return signal data sampled during the first active operating period 510 to mitigate and filter aliased return signals 114 sampled during the second active operating period 510. Any suitable number of consecutive active operating periods 510 may be used in accordance with this use case as described herein.

Some Examples of Continuous Wave (CW) LiDAR Systems

As discussed above, some LiDAR systems may use a continuous wave (CW) laser to detect the range and/or velocity of targets, rather than pulsed TOF techniques. Such systems include frequency modulated continuous wave (FMCW) coherent LiDAR systems. For example, any of the LiDAR systems 100, 202, 250, 270, and 300 described above can be configured to operate as an FMCW coherent LiDAR system.

Figure 7:
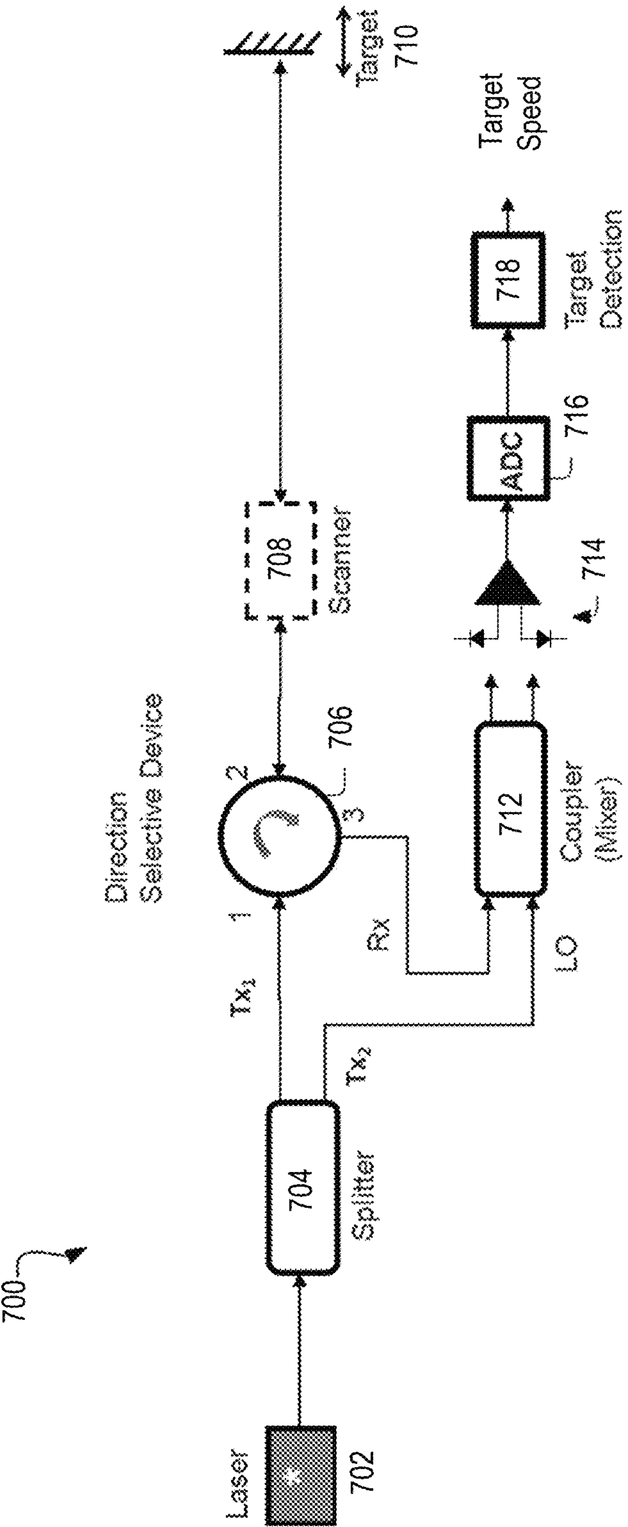
FIG. 7 is an illustration of an example frequency modulated continuous wave (FMCW) coherent LiDAR system.

FIG. 7 illustrates an exemplary FMCW coherent LiDAR system 700 configured to determine the radial velocity of a target. LiDAR system 700 includes a laser 702 configured to produce a laser signal which is provided to a splitter 704. The laser 702 may provide a laser signal having a substantially constant laser frequency.

In one example, a splitter 704 provides a first split laser signal Tx1 to a direction selective device 706, which provides (e.g., forwards) the signal Tx1 to a scanner 708. In some examples, the direction selective device 706 is a circulator. The scanner 708 uses the first laser signal Tx1 to transmit light emitted by the laser 702 and receives light reflected by the target 710 (e.g., "reflected light" or "reflections"). The reflected light signal Rx is provided (e.g., passed back) to the direction selective device 706. The second laser signal Tx2 and reflected light signal Rx are provided to a coupler (also referred to as a mixer) 712. The mixer may use the second laser signal Tx2 as a local oscillator (LO) signal and mix it with the reflected light signal Rx. The mixer 712 may be configured to mix the reflected light signal Rx with the local oscillator signal LO to generate a beat frequency $f_{beat}$ when detected by a differential photodetector 714. The beat frequency $f_{beat}$ from the differential photodetector 714 output is configured to produce a current based on the received light. The current may be converted to voltage by an amplifier (e.g., transimpedance amplifier (TIA)), which may be provided (e.g., fed) to an analog-to-digital converter (ADC) 716 configured to convert the analog voltage signal to digital samples for a target detection module 718. The target detection module 718 may be configured to determine (e.g., calculate) the radial velocity of the target 710 based on the digital sampled signal with beat frequency $f_{beat}$.

In one example, the target detection module 718 may identify Doppler frequency shifts using the beat frequency $f_{beat}$ and determine the radial velocity of the target 710 based on those shifts. For example, the velocity of the target 710 can be calculated using the following relationship:

$$f_d = \frac{2}{\lambda} v_t$$

where, $f_d$ is the Doppler frequency shift, λ is the wavelength of the laser signal, and Vt is the radial velocity of the target 710. In some examples, the direction of the target 710 is indicated by the sign of the Doppler frequency shift $f_d$. For example, a positive signed Doppler frequency shift may indicate that the target 710 is traveling towards the system 700 and a negative signed Doppler frequency shift may indicate that the target 710 is traveling away from the system 700.

In one example, a Fourier Transform calculation is performed using the digital samples from the ADC 716 to recover the desired frequency content (e.g., the Doppler frequency shift) from the digital sampled signal. For example, a controller (e.g., target detection module 718)

may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the LiDAR system 700 is described above as being configured to determine the radial velocity of a target, it should be appreciated that the system can be configured to determine the range and/or radial velocity of a target. For example, the LIDAR system 700 can be modified to use laser chirps to detect the velocity and/or range of a target.

Figure 8:
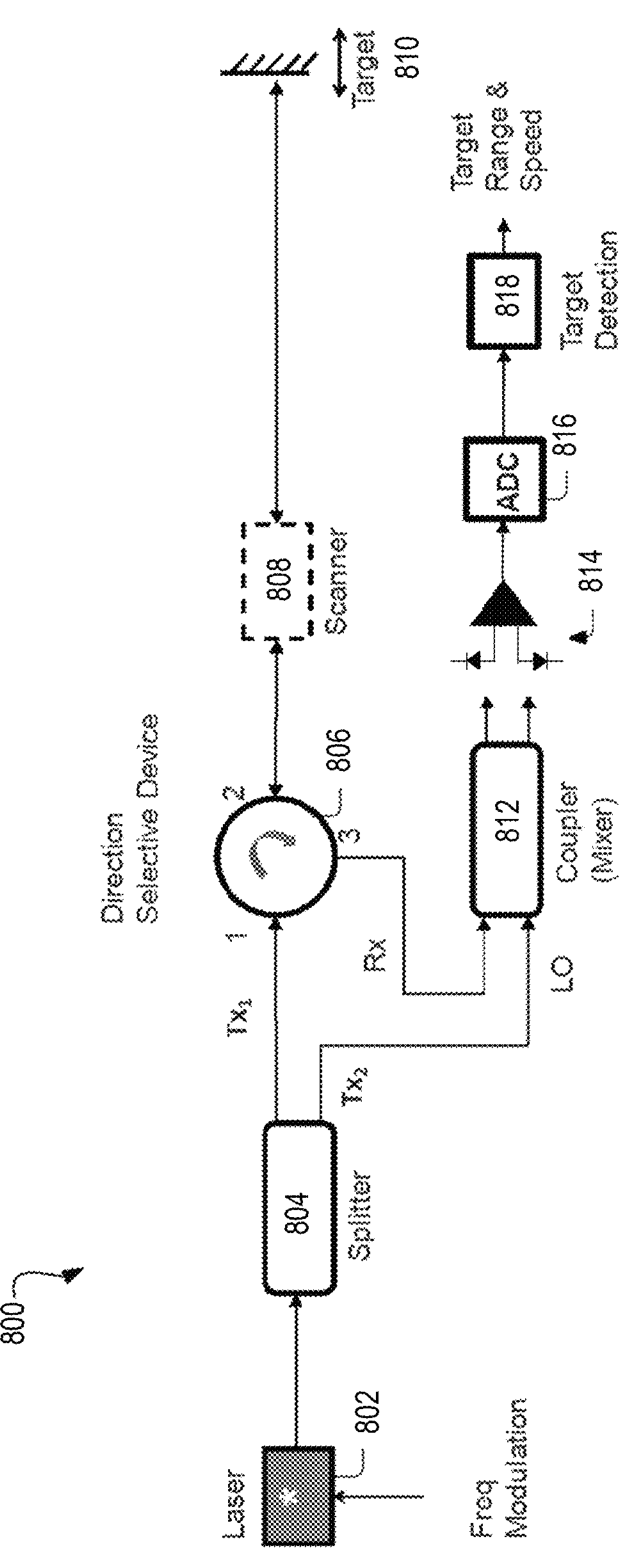
FIG. 8 is an illustration of another example FMCW coherent LiDAR system.

FIG. 8 illustrates an exemplary FMCW coherent LiDAR system 800 configured to determine the range and/or radial velocity of a target. LiDAR system 800 includes a laser 802 configured to produce a laser signal which is fed into a splitter 804. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 802; however, in other examples, an external modulator can be placed between the laser source 802 and the splitter 804.

In other examples, the laser frequency can be "chirped" by modulating the phase of the laser signal (or light) produced by the laser 802. In one example, the phase of the laser signal is modulated using an external modulator placed between the laser source 802 and the splitter 804; however, in some examples, the laser source 802 may be modulated directly by changing operating parameters (e.g., current/voltage) or include an internal modulator. Similar to frequency chirping, the phase of the laser signal can be increased ("ramped up") or decreased ("ramped down") over time.

Some examples of systems with FMCW-based LiDAR sensors have been described. However, the techniques described herein may be implemented using any suitable type of LiDAR sensors including, without limitation, any suitable type of coherent LiDAR sensors (e.g., phase-modulated coherent LiDAR sensors). With phase-modulated coherent LiDAR sensors, rather than chirping the frequency of the light produced by the laser (as described above with reference to FMCW techniques), the LiDAR system may use a phase modulator placed between the laser 802 and the splitter 804 to generate a discrete phase modulated signal, which may be used to measure range and radial velocity.

As shown, the splitter 804 provides a first split laser signal Tx1 to a direction selective device 806, which provides (e.g., forwards) the signal Tx1 to a scanner 808. The scanner 808 uses the first laser signal Tx1 to transmit light emitted by the laser 802 and receives light reflected by the target 810. The reflected light signal Rx is provided (e.g., passed back) to the direction selective device 806. The second laser signal Tx2 and reflected light signal Rx are provided to a coupler (also referred to as a mixer) 812. The mixer may use the second laser signal Tx2 as a local oscillator (LO) signal and mix it with the reflected light signal Rx. The mixer 812 may be configured to mix the reflected light signal Rx with the local oscillator signal LO to generate a beat frequency $f_{beat}$. The mixed signal with beat frequency $f_{beat}$ may be provided to a differential photodetector 814 configured to produce a current based on the received light. The current may be converted to voltage by an amplifier (e.g., a transimpedance amplifier (TIA)), which may be provided (e.g., fed) to an analog-to-digital converter (ADC) 816 configured to convert the analog voltage to digital samples for a target detection module 818. The target detection module 818 may be configured to determine (e.g., calculate) the range and/or radial velocity of the target 810 based on the digital sampled signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

Range resolution:

$$\Delta R = \frac{c}{2BW}$$

(given a perfectly linear chirp), and

Range:

$$R = \frac{f_{beat} c T_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

Figures 9A, 9B:
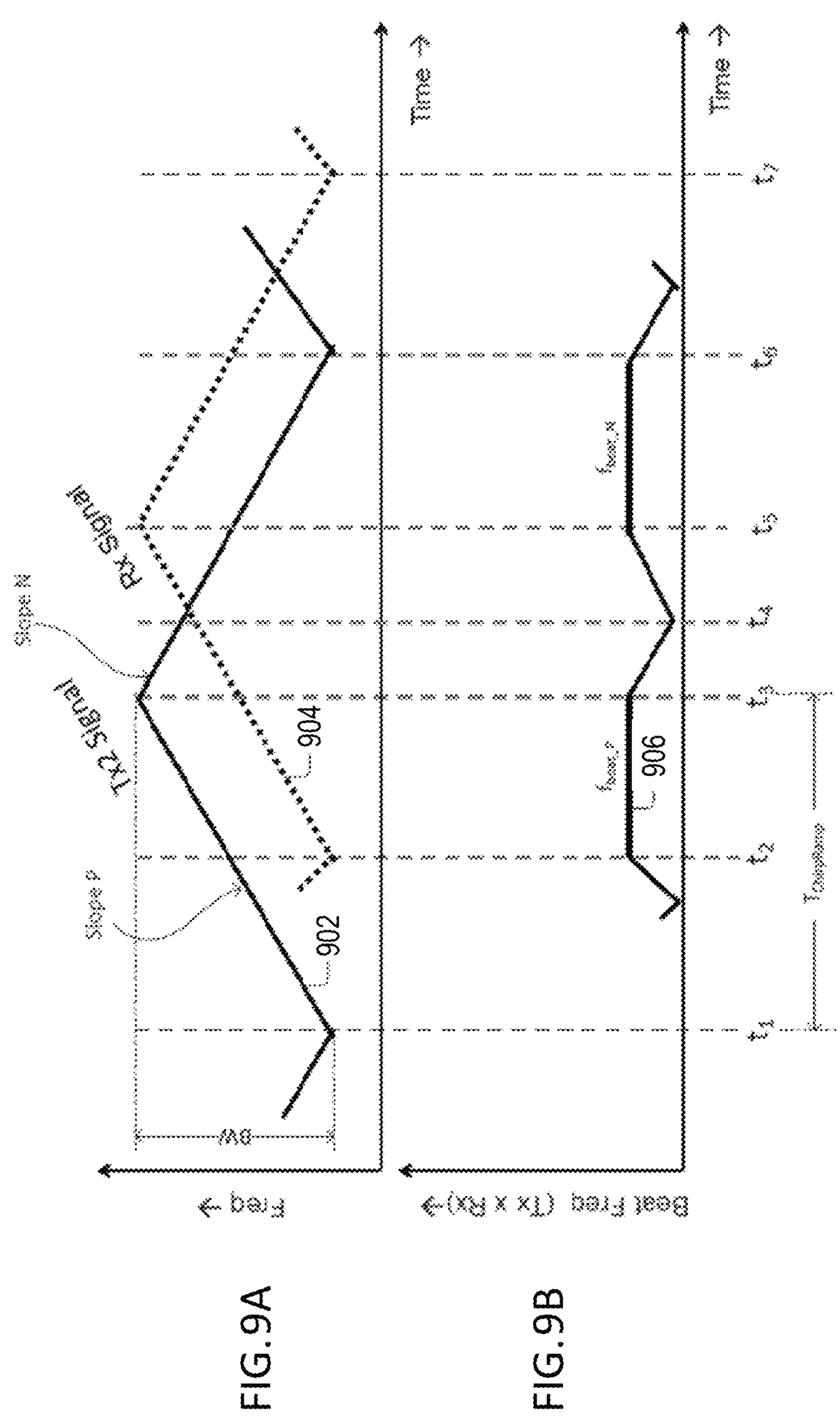
FIG. 9A is a plot of a frequency chirp as a function of time in a transmitted laser signal and reflected signal.
FIG. 9B is a plot illustrating a beat frequency of a mixed signal.

FIG. 9A is a plot of ideal (or desired) frequency chirp as a function of time in the transmitted laser signal Tx (e.g., signal Tx2), depicted in solid line 902, and reflected light signal Rx, depicted in dotted line 904. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 9B is a plot illustrating the corresponding ideal beat frequency $f_{beat}$ 906 of the mixed signal Tx2 x Rx. Note that the beat frequency $f_{beat}$ 906 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 9A-9B, when the positive and negative ramp pair is used to measure range and velocity simultaneously, the following relationships are utilized:

Range:

$$R = \frac{cT_{ChirpRamp}\frac{(f_{beat\_P} + f_{beat\_N})}{2}}{2BW},$$

and $$\text{Velocity: } V = \frac{\lambda\frac{(f_{beat\_P} - f_{beat\_N})}{2}}{2}$$

where $f_{beat\_P}$ and $f_{beat\_N}$ are beat frequencies generated during positive (P) and negative (N) slopes of the chirp 902 respectively and $\lambda$ is the wavelength of the laser signal.

In one example, the scanner 808 of the LiDAR system 800 is used to scan the environment and generate a target point cloud from the acquired scan data. In some examples, the LiDAR system 800 can use processing methods that include performing one or more Fourier Transform calculations, such as a Fast Fourier Transform (FFT) or a Discrete Fourier Transform (DFT), to generate the target point cloud from the acquired scan data. Being that the system 800 is capable of measuring range, each point in the point cloud may have a three-dimensional location (e.g., x, y, and z) in addition to radial velocity. In some examples, the x-y location of each target point corresponds to a radial position of the target point relative to the scanner 808. Likewise, the z location of each target point corresponds to the distance between the target point and the scanner 808 (e.g., the range). In one example, each target point corresponds to one frequency chirp 902 in the laser signal. For example, the samples collected by the system 800 during the chirp 902 (e.g., t1 to t6) can be processed to generate one point in the point cloud.

Some Examples of Computing Devices and Information Handling Systems

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price.

Figure 10:
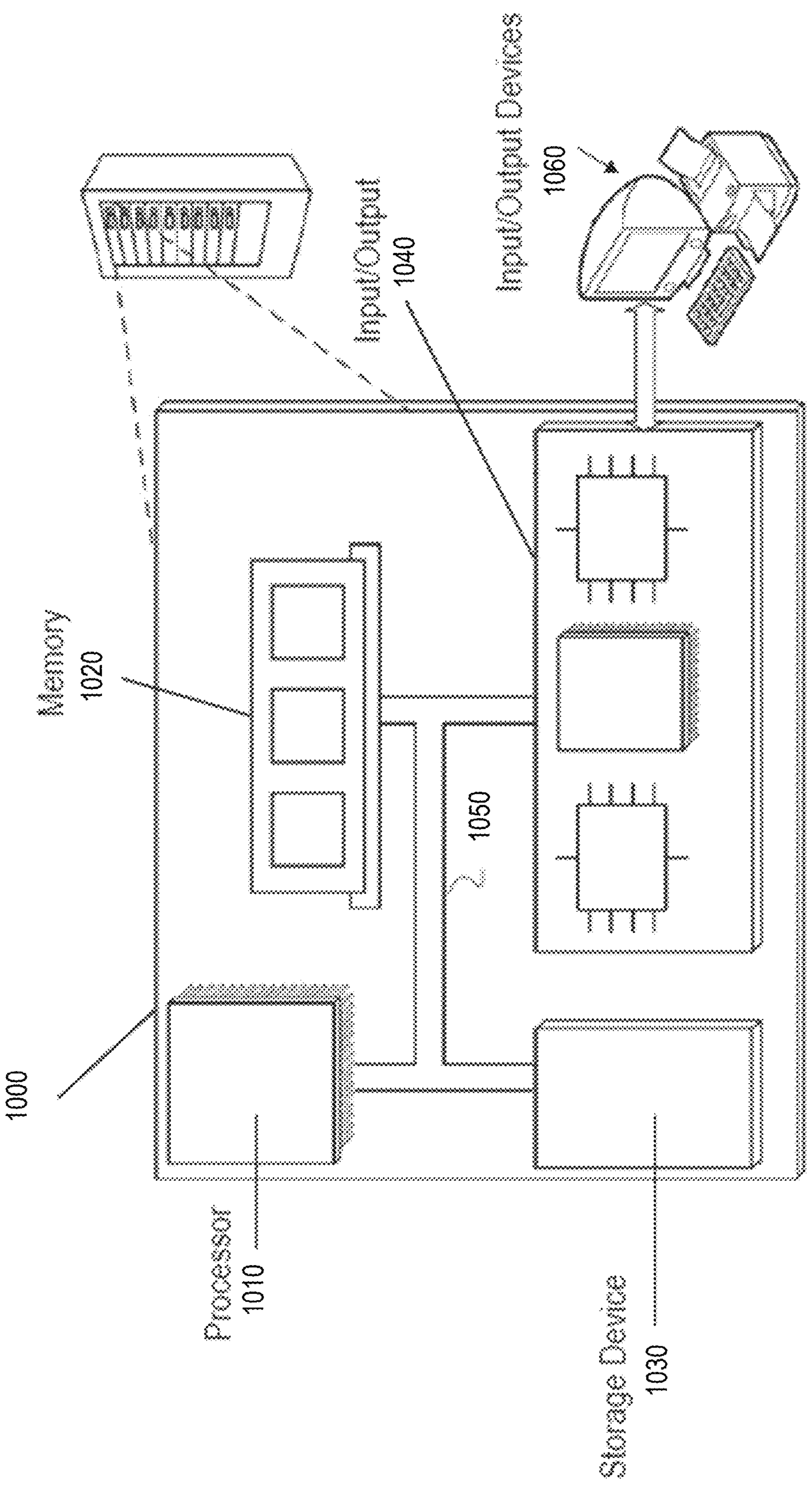
FIG. 10 is a block diagram of an example computer system.

FIG. 10 is a block diagram of an example computer system 1000 that may be used in implementing the technology described in this document. General-purpose computers, network appliances, mobile devices, or other electronic systems may also include at least portions of the system 1000. The system 1000 includes a processor 1010, a memory 1020, a storage device 1030, and an input/output device 1040. Each of the components 1010, 1020, 1030, and 1040 may be interconnected, for example, using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030.

The memory 1020 stores information within the system 1000. In some implementations, the memory 1020 is a non-transitory computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a non-transitory computer-readable medium. In various different implementations, the storage device 1030 may include, for example, a hard disk device, an optical disk device, a solid-date drive, a flash drive, or some other large capacity storage device. For example, the storage device may store long-term data (e.g., database data, file system data, etc.). The input/output device 1040 provides input/output operations for the system 1000. In some implementations, the input/output device 1040 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1060. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1030 may be implemented in a distributed way over a network, for example as a server farm or a set of widely distributed servers, or may be implemented in a single computing device.

Although an example processing system has been described in FIG. 10, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Terminology

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A light detection and ranging (LiDAR) method comprising, with a LiDAR system:

transmitting, by a first transmitter, a first optical signal;

receiving one or more first return signals corresponding to the first optical signal during a first long-range listening period and/or a first short-range listening period;

transmitting, by the first transmitter, a second optical signal;

transmitting, by a second transmitter, a third optical signal;

detecting a set of return signals during a second short-range listening period, where the set of return signals comprises one or more second return signals corresponding to the second optical signal and/or one or more third return signals corresponding to the third optical signal;

sampling the set of return signals; and filtering the sampled set of return signals detected during the second short-range listening period based on the one or more first return signals received during the first long-range listening period and/or the first short-range listening period, wherein the first transmitter and the second transmitter are both located in the same housing.

2. The method of claim 1, wherein a transmission range of the first optical signal and a transmission range of the second optical signal are longer than a transmission range of the third optical signal.

3. The method of claim 2, wherein the transmission range of the third optical signal is between approximately 10 meters and approximately 20 meters.

4. The method of claim 2, wherein the transmission range of the third optical signal is less than approximately 2 meters.

5. The method of claim 1, wherein the first optical signal is emitted before both the second optical signal and the third optical signal.

6. The method of claim 1, wherein the first optical signal is emitted after both the second optical signal and the third optical signal.

7. The method of claim 1, wherein the second optical signal is emitted before the third optical signal.

8. The method of claim 1, wherein transmitting the first optical signal comprises transmitting the first optical signal into a medium-range scan area and/or a long-range scan area.

9. The method of claim 1, wherein transmitting the second optical signal comprises transmitting the second optical signal into a medium-range scan area and/or a long-range scan area.

10. The method of claim 9, wherein transmitting the third optical signal comprises transmitting the third optical signal into a short-range scan area.

11. The method of claim 10, wherein the short-range scan area is spatially distant from the medium-range scan area and/or the long-range scan area.

12. The method of claim 1, wherein the receiving of a last return signal of the one or more first return signals occurs during the first short-range listening period.

13. The method of claim 1, wherein the detecting of a last return of the one or more second return signals occurs during the second short-range listening period.

14. The method of claim 1, wherein the detecting of the set of return signals occurs after transmitting the third optical signal.

15. The method of claim 1, wherein each of the one or more first return signals, the one or more second return signals, and the one or more third return signals is detected by a common channel signal detector.

16. The method of claim 1, wherein filtering the second return signals comprises:

identifying an anti-correlation between the one or more first return signals and the set of return signals detected during the second short-range listening period; and removing, based on the anti-correlation, the one or more second return signals from the set of return signals detected during the second short-range listening period.

17. The method of claim 16, wherein identifying the anti-correlation comprises determining that a magnitude of the anti-correlation exceeds a threshold value.

18. The method of claim 1, further comprising:

generating an output dataset based on the sampled and filtered set of return signals.

19. The method of claim 1, wherein the set of return signals is a first set of return signals, the method further comprising:

transmitting, by the first transmitter, a fourth optical signal;

transmitting, by the second transmitter, a fifth optical signal;

detecting a second set of return signals during a third short-range listening period, wherein the second set of return signals comprises one or more fourth return signals corresponding to the fourth optical signal and one or more fifth return signals corresponding to the fifth optical signal;

sampling the second set of return signals; and filtering the first sampled set of return signals detected during the second short-range listening period based on the second sampled set of return signals detected during the third short-range listening period.

20. The method of claim 19, wherein filtering the first sampled set of return signals comprises:

identifying a positive correlation between the first sampled set of return signals detected during the second short-range listening period and the second sampled set of return signals detected during the third short-range listening period; and removing, based on the positive correlation, from the first sampled set of return signals detected during the second short-range listening period, one or more return signals that are not correlated with the second sampled set of return signals detected during the third short-range listening period.

21. The method of claim 19, wherein the fifth optical signal is transmitted after the fourth optical signal.

22. The method of claim 19, wherein the fourth optical signal and fifth optical signal are both transmitted after the second optical signal and the third optical signal.

23. The method of claim 19, wherein the fourth optical signal and fifth optical signal are both transmitted before the second optical signal and the third optical signal.

24. A LiDAR system comprising:

a first transmitter configured to transmit a first optical signal and a second optical signal;

a second transmitter configured to transmit a third optical signal, wherein the first transmitter and the second transmitter are both located in the same housing;

a receiver configured to:

receive one or more first return signals corresponding to the first optical signal during a first long-range listening period and/or a first short-range listening period; and detect a set of return signals during a second short-range listening period, where the set of return signals comprises one or more second return signals corresponding to the second optical signal and/or one or more third return signals corresponding to the third optical signal; and a processing device configured to:

sample the set of return signals; and filter the sampled set of return signals detected during the second short-range listening period based on the one or more first return signals received during the first long-range listening period and/or the first short-range listening period.

25. The system of claim 24, wherein a transmission range of the first optical signal and a transmission range of the second optical signal are longer than a transmission range of the third optical signal.

26. The system of claim 25, wherein the transmission range of the third optical signal is between approximately 10 meters and approximately 20 meters.

27. The system of claim 25, wherein the transmission range of the third optical signal is less than approximately 2 meters.

28. The system of claim 24, wherein the first optical signal is configured to be emitted before both the second optical signal and the third optical signal.

29. The system of claim 24, wherein the first optical signal is configured to be emitted after both the second optical signal and the third optical signal.

30. The system of claim 24, wherein the second optical signal is configured to be emitted before the third optical signal.

31. The system of claim 24, wherein the first transmitter is configured to transmit the first optical signal by:

transmitting the first optical signal into a medium-range scan area and/or a long-range scan area.

32. The system of claim 24, wherein the first transmitter is configured to transmit the second optical signal by:

transmitting the second optical signal into a medium-range scan area and/or a long-range scan area.

33. The system of claim 32, wherein the second transmitter is configured to transmit the third optical signal by:

transmitting the third optical signal into a short-range scan area.

34. The system of claim 33, wherein the short-range scan area is spatially distant from the medium-range scan area and/or the long-range scan area.

35. The system of claim 24, wherein the receiver is configured to receive a last return signal of the one or more first return signals during the first short-range listening period.

36. The system of claim 24, wherein the receiver is configured to detect a last return of the one or more second return signals during the second short-range listening period.

37. The system of claim 24, wherein the detecting of the set of return signals occurs after transmitting the third optical signal.

38. The system of claim 24, wherein the receiver comprises a common channel signal detection and wherein the common channel signal detector is configured to detect each of the one or more first return signals, the one or more second return signals, and the one or more third return signals.

39. The system of claim 24, wherein processing device is configured to filter the second return signals by:

identifying an anti-correlation between the one or more first return signals and the set of return signals detected during the second short-range listening period; and removing, based on the anti-correlation, the one or more second return signals from the set of return signals detected during the second short-range listening period.

40. The system of claim 39, wherein identifying the anti-correlation comprises determining that a magnitude of the anti-correlation exceeds a threshold value.

41. The system of claim 24, wherein the processing device is configured to:

generate an output dataset based on the sampled and filtered set of return signals.

42. The system of claim 24, wherein the set of return signals is a first set of return signals, wherein the first transmitter is configured to transmit a fourth optical signal, wherein the second transmitter is configured to transmit a fifth optical signal, wherein the receiver is configured to:

detect a second set of return signals during a third short-range listening period, wherein the second set of return signals comprises one or more fourth return signals corresponding to the fourth optical signal and one or more fifth return signals corresponding to the fifth optical signal, and wherein the processing device is configured to:

sample the second set of return signals; and filter the first sampled set of return signals detected during the second short-range listening period based on the second sampled set of return signals detected during the third short-range listening period.

43. The system of claim 42, wherein the processing device is configured to filter the first sampled set of return signals by:

identifying a positive correlation between the first sampled set of return signals detected during the second short-range listening period and the second sampled set of return signals detected during the third short-range listening period; and removing, based on the positive correlation, from the first sampled set of return signals detected during the second short-range listening period, one or more return signals that are not correlated with the second sampled set of return signals detected during the third short-range listening period.

44. The system of claim 42, wherein the fifth optical signal is configured to be transmitted after the fourth optical signal.

45. The system of claim 42, wherein the fourth optical signal and fifth optical signal are both configured to be transmitted after the second optical signal and the third optical signal.

46. The system of claim 42, wherein the fourth optical signal and fifth optical signal are both configured to be transmitted before the second optical signal and the third optical signal.

* * * * *